United States Patent
Tanaka et al.

(10) Patent No.: US 8,374,062 B2
(45) Date of Patent: Feb. 12, 2013

(54) HEAT ASSIST MAGNETIC WRITE HEAD, HEAD GIMBALS ASSEMBLY, HEAD ARM ASSEMBLY, AND MAGNETIC DISK DEVICE

(75) Inventors: Kosuke Tanaka, Tokyo (JP); Tetsuya Roppongi, Tokyo (JP); Daisuke Miyauchi, Tokyo (JP); Katsuki Kurihara, Tokyo (JP)

(73) Assignee: TDK Corporation, Tokyo (JP)

( * ) Notice: Subject to any disclaimer, the term of this patent is extended or adjusted under 35 U.S.C. 154(b) by 212 days.

(21) Appl. No.: 12/888,857

(22) Filed: Sep. 23, 2010

(65) Prior Publication Data

US 2012/0075965 A1   Mar. 29, 2012

(51) Int. Cl.
  *G11B 11/00*  (2006.01)
(52) U.S. Cl. .................. 369/13.33; 369/112.27
(58) Field of Classification Search .......... 369/13.33, 369/13.32, 13.24, 13.14, 13.03, 13.02, 13.12, 369/112.27, 112.09, 112.01; 360/59, 125.31, 360/125.74
See application file for complete search history.

(56) References Cited

U.S. PATENT DOCUMENTS

| | | | |
|---|---|---|---|
| 8,077,559 B1 * | 12/2011 | Miyauchi et al. .......... | 369/13.33 |
| 8,089,831 B2 * | 1/2012 | Chou et al. ................. | 369/13.33 |
| 8,102,625 B2 * | 1/2012 | Shiramatsu et al. ...... | 360/125.74 |
| 8,116,172 B2 * | 2/2012 | Ito et al. .................... | 369/13.33 |
| 8,149,654 B2 * | 4/2012 | Komura et al. ............ | 369/13.33 |
| 2009/0073597 A1 | 3/2009 | Shiramatsu et al. | |

FOREIGN PATENT DOCUMENTS

| JP | A 2001-216673 | 8/2001 |
|---|---|---|
| JP | A 2001-283403 | 10/2001 |
| JP | A 2009-59417 | 3/2009 |

OTHER PUBLICATIONS

U.S. Appl. No. 12/710,129, filed Feb. 22, 2010 in the name of Chou et al.
U.S. Appl. No. 12/557,078, filed Sep. 10, 2009.

* cited by examiner

*Primary Examiner* — Ali Neyzari
(74) *Attorney, Agent, or Firm* — Oliff & Berridge, PLC

(57) ABSTRACT

The magnetic read write head has a read head and a write head, each having an end face exposed on an air bearing surface. The write head performs heat assist magnetic recording, and is provided with: a magnetic pole having an end face exposed on the air bearing surface; a waveguide extending toward the air bearing surface to propagate light; and a plasmon generator provided between the magnetic pole and the waveguide, and generating near-field light based on the light propagated through the waveguide to emit the generated near-field light from the air bearing surface. The waveguide is surrounded by a clad layer, and the magnetic pole is in contact with a heat sink having a heat conductivity higher than that of the clad layer. Although the near-field light causes temperature rise, heat energy from the plasmon generator to the magnetic pole is released through the heat sink.

11 Claims, 15 Drawing Sheets

HEAT ASSIST MAGNETIC WRITE HEAD, HEAD GIMBALS ASSEMBLY, HEAD ARM ASSEMBLY, AND MAGNETIC DISK DEVICE

BACKGROUND OF THE INVENTION

1. Field of the Invention

The invention relates to a heat assist magnetic write head used in heat assist magnetic recording in which near-field light is irradiated to lower a coercivity of a magnetic recording medium so as to perform writing of information, and to a head gimbals assembly, to a head arm assembly, and to a magnetic disk device provided with the same.

2. Description of the Related Art

A magnetic disk device has been heretofore used as a device which performs writing and reading of magnetic information (hereinafter simply referred to as information). The magnetic disk device is provided, inside of a housing, for example, with a magnetic disk into which the information is stored, and a magnetic read write head which performs writing of the information on the magnetic disk and which performs reading of the information written in the magnetic disk. The magnetic disk is supported on a rotary shaft of a spindle motor secured to the housing, and is rotated therearound. On the other hand, the magnetic read write head is formed on one side face of a magnetic head slider provided on one end of a suspension, and is configured by including a magnetic write element and a magnetic read element that have an air-bearing surface (ABS: Air Bearing Surface) opposed to the magnetic disk. For the magnetic read element, an MR element which exhibits a magnetoresistive (MR: Magnetoresistive) effect has been generally used, in particular. The other end of the suspension is attached to a tip of an arm rotatably supported on a fixed shaft which stands in the housing.

The magnetic read write head is not present on the magnetic disk and is in a state (an unload state) where it is retracted to the outside, when the magnetic disk device is in a stationary state, i.e., when the magnetic disk does not rotate and remains at rest. Herein, when the magnetic disk device is in a drive state and the magnetic disk starts to rotate, the magnetic read write head is in a state (a loaded state) where it is moved together with the suspension to a predetermined position on the magnetic disk. When the magnetic disk reaches the predetermined number of rotation, the magnetic head slider becomes stable in a state in which it flies slightly above a surface of the magnetic disk, thus making it possible to write and read the information accurately.

In recent years, with a progress in higher recording density (higher capacity) of the magnetic disk, an improvement in performance of the magnetic read write head as well as the magnetic disk has been demanded accordingly. The magnetic disk is a discrete medium in which magnetic fine particles are aggregated, and each of the magnetic fine particles has a single-domain structure. In this magnetic disk, a single recording bit is structured by a plurality of magnetic fine particles. In order to improve the recording density, it is necessary to reduce asperities at boundaries between the adjoining recording bits. Hence, it is necessary to make the magnetic fine particles smaller. However, making the magnetic fine particles smaller causes an issue that a thermal stability of magnetization of the magnetic fine particles decreases with decreasing volume of the magnetic fine particles. To solve this issue, it is effective to increase anisotropic energy of the magnetic fine particles. However, increasing the anisotropic energy of the magnetic fine particles leads to an increase in coercivity of the magnetic disk, and here rises an issue that this makes it difficult for an existing magnetic head to write the information.

To solve the foregoing issues, there has been proposed a method so-called heat assist magnetic recording. This method uses a magnetic recording medium having a high coercivity. When writing the information, a magnetic field as well as heat are applied simultaneously to a region of the magnetic recording medium where the information is to be written, to increase a temperature of that region to decrease the coercivity so as to perform the writing of the information. Hereinafter, a magnetic head used in the heat assist magnetic recording will be referred to as a heat assist magnetic write head.

In the heat assist magnetic recording, a method which utilizes near-field light is typically used as a way of applying the heat to the magnetic recording medium. As a method of generating the near-field light, a method is generally known, which uses a near-field optical probe or a so-called plasmon generator, which is a piece of metal that generates the near-field light from plasmons excited by irradiation of light. However, the plasmon generator which generates the near-field light by the direct irradiation of light is known to exhibit very low efficiency of transformation of the irradiated light into the near-field light. The energy of the light irradiated to the plasmon generator is mostly reflected off a surface of the plasmon generator, or is transformed into thermal energy and absorbed by the plasmon generator. The plasmon generator is small in volume since a size of the plasmon generator is set to be equal to or smaller a wavelength of the light. Thus, in the plasmon generator, a rise in temperature due to the absorption of the thermal energy described above becomes significantly large.

Incidentally, for the heat assist magnetic recording, it is desired that a position of generation of a write magnetic field and a position of generation of the near-field light be located as close as possible in a medium facing surface. For example, U.S. Patent Application Publication No. 2007/139818 specification discloses a magnetic head in which a near-field light generating part that generates near-field light when irradiated with laser light and an end of a main magnetic-pole layer are arranged to be laid over each other directly or with a dielectric layer therebetween in a medium facing surface. Also, U.S. Patent Application Publication No. 2009/168220 specification discloses a magnetic head in which at least a part of a main magnetic pole is arranged between a first and a second near-field light generating part each of which generates near-field light when irradiated by laser light. However, when the main magnetic pole for generating the write magnetic field and the plasmon generator for generating the near-field light are arranged closely, the main magnetic pole is heated due to the rise in the temperature of the plasmon generator. As a result, the main magnetic pole is likely to corrode by moisture in the atmosphere depending on an ambient humidity condition.

Therefore, it is desirable to suppress the corrosion of the main magnetic pole due to the temperature rise to ensure long-term reliability, while maintaining performance in writing.

SUMMARY OF THE INVENTION

A heat assist magnetic write head according to an embodiment of the invention includes: a magnetic pole having an end face exposed on an air bearing surface; a waveguide extending toward the air bearing surface to propagate light; and a plasmon generator provided between the magnetic pole and the waveguide, and generating near-field light based on the light propagated through the waveguide to emit the generated near-field light from the air bearing surface. The waveguide is surrounded by a clad layer in a cross-section parallel to the air bearing surface. The magnetic pole is in contact with a heat-releasing portion having a heat conductivity higher than that of the clad layer.

A head gimbals assembly, a head arm assembly, and a magnetic disk device according to an embodiment of the invention each include the heat assist magnetic write head described above.

In the heat assist magnetic write head according to the embodiment of the invention, a heat sink formed of a material having a higher conductivity than that of a material around the waveguide is so provided as to contact with the magnetic pole. Thereby, heating of the magnetic pole accompanied by a rise in temperature of the plasmon generator is suppressed in performing heat assist magnetic recording. This makes it possible to arrange the magnetic pole and the plasmon generator closely to each other without causing corrosion of the magnetic pole which generates a write magnetic field. As a result, it is possible to achieve more efficient yet stable writing operation while ensuring long-term reliability.

DETAILED DESCRIPTION OF THE PREFERRED EMBODIMENT

Hereinafter, an embodiment of the invention will be described in detail with reference to the drawings.

[Configuration of Magnetic Disk Device]

First, a configuration of a magnetic disk device according to an embodiment of the invention will be described below with reference to FIGS. 1 and 2.

Figure 1:
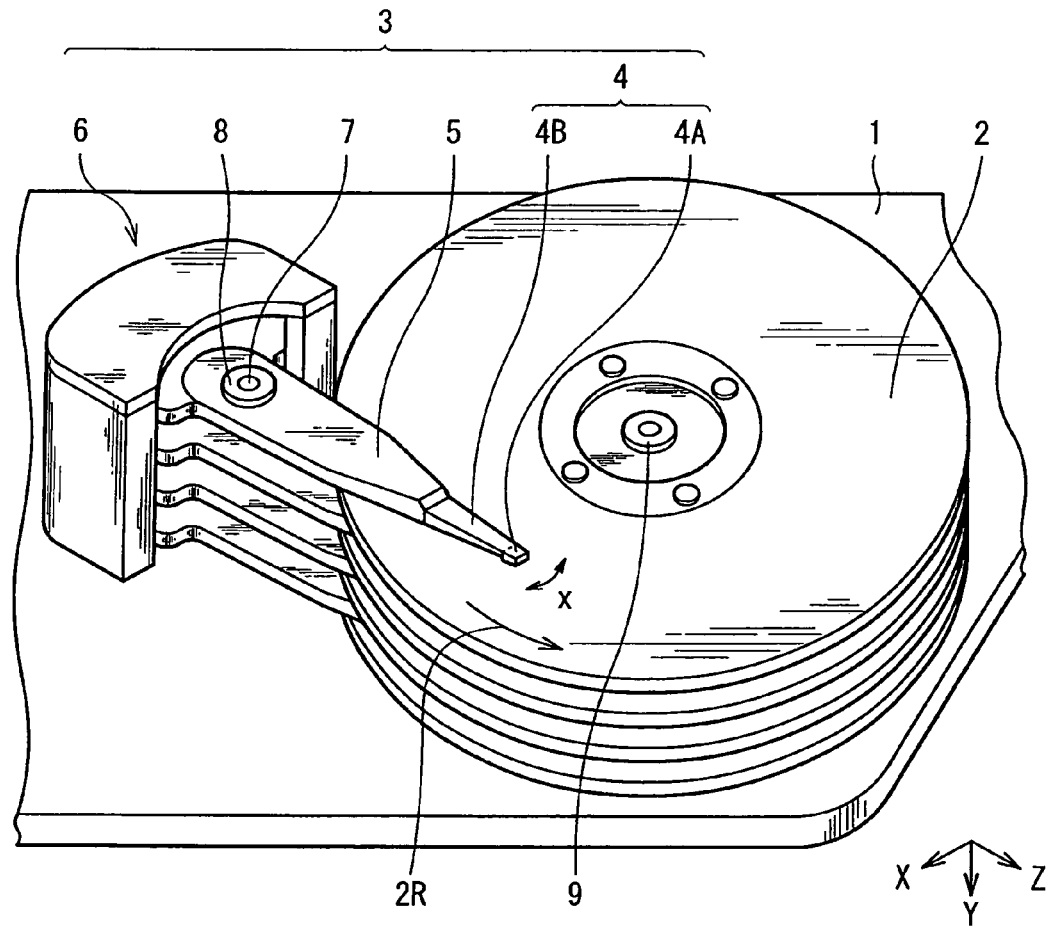
FIG. 1 is a perspective view illustrating a configuration of a magnetic disk device provided with a magnetic read write head according to an embodiment of the invention.

FIG. 1 is a perspective view illustrating an internal configuration of a magnetic disk device according to this embodiment. This magnetic disk device employs an load/unload (load/unload) scheme as a drive scheme, and is provided, inside of a housing 1, with a magnetic disk 2 as a magnetic recording medium on which information is to be written, and a head arm assembly (HAA: Head Ann Assembly) 3 for performing writing of the information on the magnetic disk 2 and reading of that information, for example. The HAA 3 is provided with a head gimbals assembly (HGA: Head Gimbals Assembly) 4, an arm 5 which supports a base of the HGA 4, and a drive section 6 which rotates the arm 5 as a source of power. The HGA 4 has a magnetic head slider (hereinafter, simply referred to as a "slider") 4A whose one side face is provided with a magnetic read write head (described later) according to this embodiment, and a suspension 4B whose one end is attached with the slider 4A. The other end of the suspension 4B (an end which is on an opposite side of the slider 4A) is supported by the arm 5. The arm 5 is configured to be rotatable through a bearing 8 around a fixed shaft 7, as a central axis, which is fixed to the housing 1. The drive section 6 is structured by a voice coil motor etc, for example. Incidentally, the magnetic disk device is provided with a plurality of magnetic disks 2 (4 disks in FIG. 1), and the sliders 4A are arranged corresponding to respective recording surfaces (a front side and a back side) of the respective magnetic disks 2. Each of the sliders 4A is moveable in a direction crossing write tracks in a plane parallel to the recording surfaces of each of the magnetic disks 2, i.e., moveable in a track-width direction (an X-axis direction). On the other hand, the magnetic disks 2 rotate in a rotational direction 2R, which is around a spindle motor 9 fixed to the housing 1 and which is substantially orthogonal to the X-axis direction. The information is written into the magnetic disks 2 or the written information is read by the rotation of the magnetic disks 2 and the movement of the sliders 4A. Further, this magnetic disk device is provided with a control circuit (described later), which controls a writing operation and a reading operation of a magnetic read write head 10, and controls a light-emitting operation of a laser diode, as a light source which generates laser light for heat assist magnetic recording described later.

Figure 2:
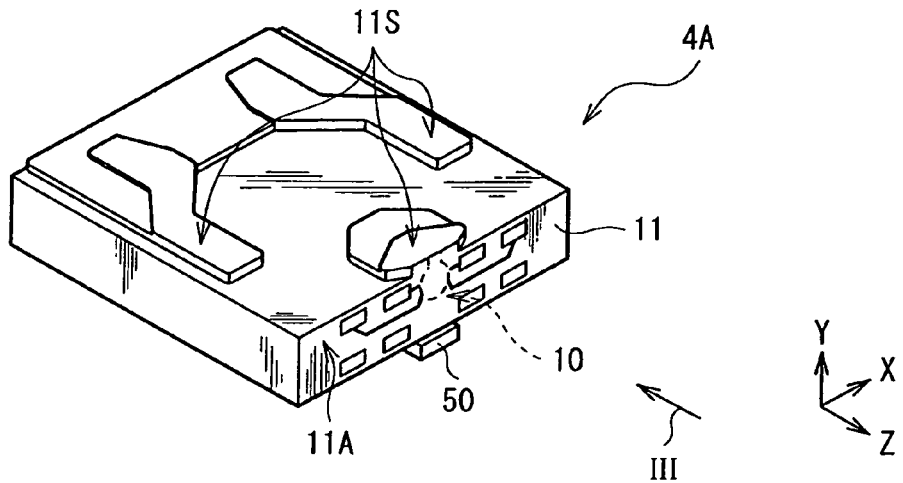
FIG. 2 is a perspective view illustrating a configuration of a slider in the magnetic disk device illustrated in FIG. 1.

FIG. 2 illustrates a configuration of the slider 4A illustrated in FIG. 1. This slider 4A has a block-like substrate 11 formed of $Al_2O_3 \cdot TiC$ (AlTiC), for example. This substrate 11 is formed substantially in a hexahedral shape, for example, and one face among them is an ABS 11S disposed closely to the recording surface of the magnetic disk 2 in an opposed manner. When the magnetic disk device is not driven, i.e., when the spindle motor 9 is stopped and the magnetic disks 2 do not rotate, a state is maintained where the sliders 4A are retracted to positions deviated from upper parts of the magnetic disks 2, in order to avoid contacting of the ABS 11S and the recording surface (an unload state). On the other hand, at activation, the magnetic disks 2 start to rotate at high speed by the spindle motor 9, and the arms 5 are rotated by the drive section 6 around the fixed shaft 7 as the central axis, and the sliders 4A move to the upper parts of the surfaces of the magnetic disks 2 to establish a load state. The high-speed rotation of the magnetic disk 2 causes an air flow between the recording surface and the ABS 11S, and the lift force caused thereby allows it to establish a state where the slider 4A flies to maintain a constant spacing (magnetic spacing) MS (FIG. 5 described later) along a direction orthogonal to the recording surface (in a Y-axis direction).

Also, an element forming face 11A as one side face orthogonal to the ABS 11S is provided with the magnetic read write head 10. Incidentally, a face 11B which is on an opposite side of the ABS 11S in the substrate 11 is provided with a light source unit 50, which is in the vicinity of the magnetic read write head 10.

[Detailed Configuration of Magnetic Read Write Head]

Next, more detailed description will be given on the magnetic read write head 10 with reference to FIGS. 3 to 5.

Figure 3:
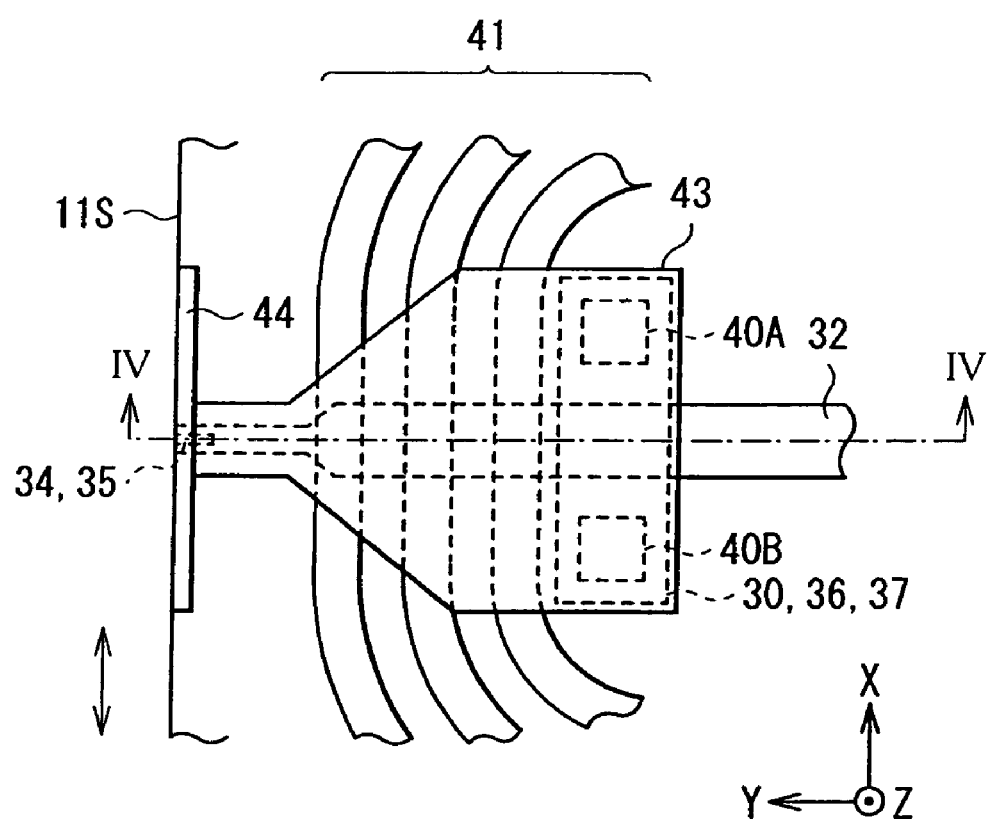
FIG. 3 is a plan view illustrating a configuration of a main part as viewed from a direction of allow III in the magnetic read write head illustrated in FIG. 2.
Figure 4:
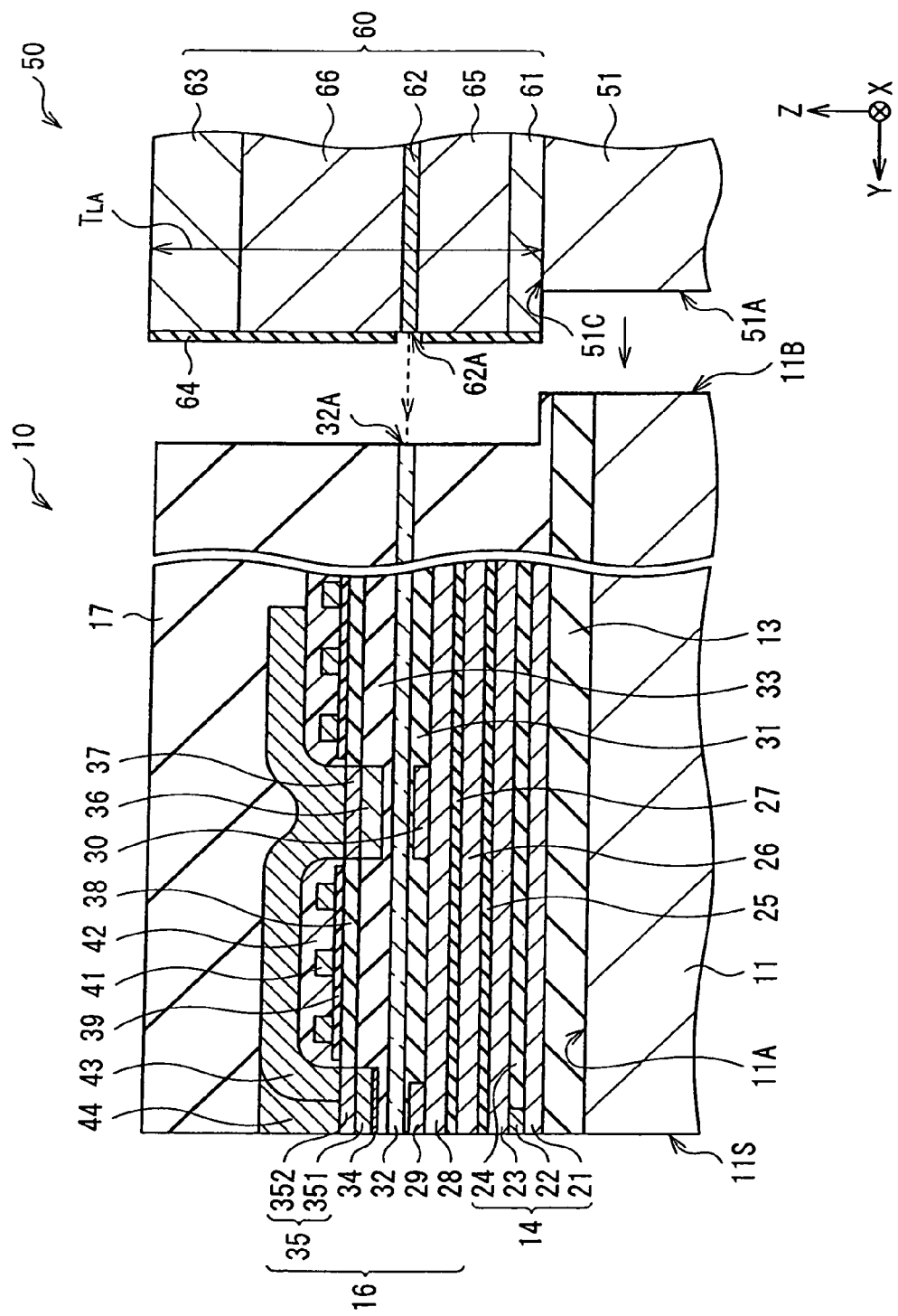
FIG. 4 is a cross-sectional view illustrating a configuration as seen in a direction of arrow along a line IV-IV in the magnetic read write head illustrated in FIG. 3.

FIG. 3 is a plan view of the magnetic read write head 10 as viewed from a direction of allow III illustrated in FIG. 2, and FIG. 4 is a cross-sectional view illustrating a configuration as seen in a direction of arrow along a line IV-IV illustrated in FIG. 3. Also, FIG. 5 is a drawing in which a part of an end face exposed on the ABS 11S is enlarged. The magnetic read write head 10 is provided with a stacked structure including an insulating layer 13, a read head portion 14, a write head portion 16, and a protecting layer 17, which are stacked in order on the substrate 11. Each of the read head portion 14 and the write head portion 16 has an end face exposed on the ABS 11S.

The read head portion 14 utilizes a magneto-resistive effect (MR: magneto-resistive effect) to perform a reading operation. This read head portion 14 is a portion in which a bottom shield layer 21, an MR element 22, and a top shield layer 23 are stacked in this order on the insulating layer 13, for example.

Each of the bottom shield layer 21 and the top shield layer 23 is configured of a soft magnetic metal material such as NiFe (a nickel-iron alloy), for example, and is so disposed to oppose each other as to sandwich the MR element 22 in between in a stack direction (a Z-axis direction), thereby allowing it to exhibit a function of protection in order to prevent an influence of an unnecessary magnetic field from reaching the MR element 22.

One end face of the MR element 22 is exposed on the ABS 11S, and the other end faces contact with an insulating layer 24 which buries a region between the bottom shield layer 21 and the top shield layer 23. The insulating layer 24 is configured of a material having an insulating property, such as $Al_2O_3$ (aluminum oxide), AlN (aluminum nitride), $SiO_2$ (silicon dioxide), and DLC (Diamond-Like Carbon).

The MR element 22 functions as a sensor for reading magnetic information recorded on the magnetic disk 2. Incidentally, in this embodiment, a direction toward the ABS 11S or a position near to the ABS 11S with reference to the MR element 22 is referred to as "front", whereas a direction toward a side opposite to the ABS 11S or a position away from the ABS 11S is referred to as "rear", in a direction orthogonal to the ABS 11S (in the Y-axis direction). The MR element 22 may be a CPP (Current Perpendicular to Plane)-GMR (Giant Magnetoresistive) element in which a sense current flows inside thereof in the stack direction, for example. Herein, the bottom shield layer 21 and the top shield layer 23 function as electrodes to supply the sense current to the MR element 22.

In the read head portion 14 having such a configuration, a magnetization direction of a free layer (not illustrated) included in the MR element 22 changes in response to a signal magnetic field from the magnetic disk 2. Hence, the magnetization direction of the free layer causes a change relative to a magnetization direction of a pinned layer (not illustrated) included also in the MR element 22. When the sense current is caused to flow to the MR element 22, the relative change between the magnetization directions appear as a change in an electrical resistance. This is utilized to detect the signal magnetic field, by which the magnetic information is read.

An insulating layer 25, an intermediate shield layer 26, and an insulating layer 27 are stacked in order on the read head portion 14. The intermediate shield layer 26 serves to prevent a magnetic field generated in the write head portion 16 from reaching the MR element 22, and is configured of a soft magnetic metal material such as NiFe, for example. The insulating layers 25 and 27 are formed by a material similar to that of the insulating film 24, for example.

The write head portion 16 is a perpendicular magnetic write head which performs a write process of a heat assist magnetic recording scheme. This write head portion 16 has a bottom yoke layer 28, a leading shield 29 and a coupling layer 30, a clad layer 31, a waveguide 32, and a clad layer 33, in order on the insulating layer 27.

Each of the bottom yoke layer 28, the leading shield 29, and the coupling layer 30 is configured of a soft magnetic metal material such as NiFe. The leading shield 29 is located at the most front part on an upper face of the bottom yoke layer 28, and is disposed such that one end face thereof is exposed on the ABS 11S. The coupling layer 30 is located at the rear of the leading shield 29 on the upper face of the bottom yoke layer 28. The clad layer 31 is formed of a dielectric material having a refractive index lower than that of the waveguide 32, and is provided to cover the bottom yoke layer 28, the leading shield 29, and the coupling layer 30. The waveguide 32 provided on the clad layer 31 extends in a direction orthogonal to the ABS 11S (in the Y-axis direction), and one end face thereof is exposed on the ABS 11S, and the other end face is exposed at the rear. Incidentally, the front end face of the waveguide 32 may be located at a position recessed from the ABS 11S without being exposed on the ABS 11S. The waveguide 32 is formed by a dielectric material which transmits the laser light. The clad layers 31 and 33 are configured of a dielectric material having a refractive index lower than that of the waveguide 32 for the laser light which propagates through the waveguide 32. For example, when the waveguide 32 is formed of $Al_2O_3$ (aluminum oxide), the clad layers 31 and 33 can be configured of $SiO_2$ (silicon dioxide). Alternatively, the waveguide 32 may be configured of $Ta_2O_5$ (tantalum oxide), and the clad layers 31 and 33 may be configured of $Al_2O_3$.

The write head portion 16 further includes a plasmon generator 34 provided above a front end portion of the waveguide 32 through the clad layer 33, and a magnetic pole 35 so disposed as to contact with an upper face of the plasmon generator 34. The plasmon generator 34 and the magnetic pole 35 are so disposed that respective one end faces thereof are exposed on the ABS 11S. The plasmon generator 34 is configured of a conducting material including one or more selected from a group consisting of Pd (palladium), Pt (platinum), Rh (rhodium), Ir (iridium), Ru (ruthenium), Au (gold), Ag (silver), Cu (copper), and aluminum (Al), for example. The magnetic pole 35 has a configuration in which a first layer 351 and a second layer 352 are stacked in order on the plasmon generator 34. Each of the first layer 351 and the second layer 352 is configured of a high saturation magnetic flux density magnetic material such as an iron-based alloy, for example. Examples of the iron-based alloy include FeCo (an iron-cobalt alloy) and FeCoNi (an iron-cobalt-nickel alloy), for example. The plasmon generator 34 generates near-field light NF (described later) from the ABS 11S based on the laser light propagated through the waveguide 32. The magnetic pole 35 accommodates a magnetic flux generated in a coil 41 (described later), and releases the magnetic flux from the ABS 11S to generate a recording magnetic flux for writing the magnetic information to the magnetic disk 2. The plasmon generator 34 and the first layer 351 are embedded in the clad layer 33. Incidentally, details such as configurations and functions of the plasmon generator 34 and the magnetic pole 35 will be described later.

The write head portion 16 further has a coupling layer 36 embedded in the clad layer 33 in the rear of the plasmon generator 34 and the magnetic pole 35, and a coupling layer 37 so provided as to contact with an upper face of the coupling layer 36. The coupling layers 36 and 37 are located above the coupling layer 30, and each configured of a soft magnetic metal material such as NiFe.

As illustrated in FIG. 3, the write head portion 16 has two coupling portions 40A and 40B embedded in the clad layers 31 and 33. These coupling portions 40A and 40B are also configured of a soft magnetic metal material such as NiFe. The coupling portions 40A and 40B so extend in the Z-axis direction as to connect the coupling layer 30 and the coupling layer 36. Also, they are so provided as to sandwich the waveguide 32 and separated away from the waveguide 32 in the X-axis direction.

Above the clad layer 33, an insulating layer 38 is so provided as to bury a surrounding of the second layer 352 of the magnetic pole 35. Above the insulating layer 38, an insulating layer 39 and the coil 41, which is formed to coil around the coupling layer 37, are stacked in order. The coil 41 causes a write current to flow therein to generate a magnetic flux for writing, and is formed by a highly-conducting material such as Cu (copper) and Au (gold). The insulating layer 38 and 39 are configured of an insulating material such as $Al_2O_3$, AlN, $SiO_2$, and DLC. These insulating layer 38, the insulating layer 39, and the coil 41 are covered with the insulating layer 42. Further, a top yoke layer 43 is so provided as to cover the insulating layer 42. The insulating layer 42 is configured of, for example, a nonmagnetic insulating material such as a photoresist and spin-on-glass (SOG: Spin On Glass) which exhibits fluidity at the time of heating. The insulating layers 38, 39, and 42 electrically separate the coil 41 from the surrounding thereof. The top yoke layer 43 is formed of a soft magnetic material having a high saturation magnetic flux density such as CoFe, and a front part thereof is connected to the second layer 352 of the magnetic pole 35, while a partial portion thereof is connected to the coupling layer 37 in the rear. Also, a front end face of the top yoke layer 43 is located at a position recessed from the ABS 11 S, and a heat sink 44 is provided between the ABS 11S and the top yoke layer 43.

Figure 5:
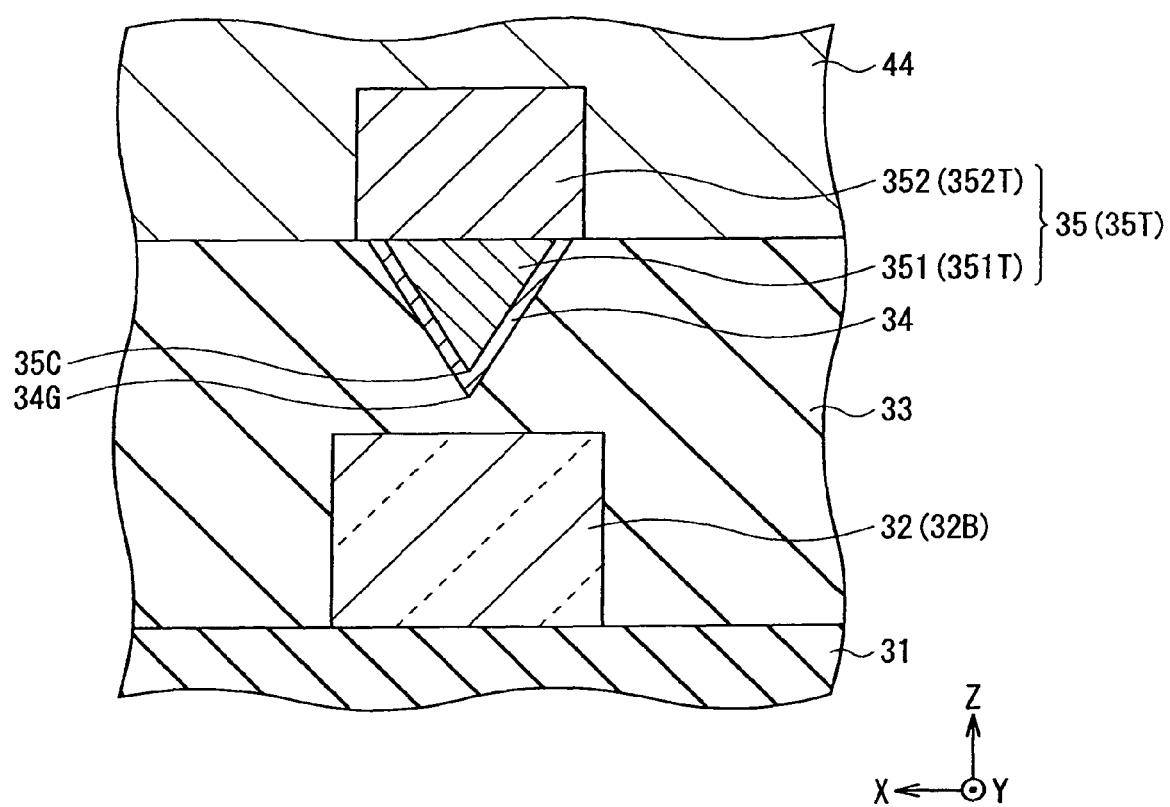
FIG. 5 is a plan view illustrating a configuration of an end face exposed on an air bearing surface in a major part of the magnetic read write head.

As illustrated in FIGS. 4 and 5, the heat sink 44 has an end face exposed on the ABS 11S, and extends in a direction away from the ABS 11S (in a minus Y-direction) while contacting with the second layer 352 of the magnetic pole 35, for example. The heat sink 44 mainly functions to prevent a rise in temperature of the magnetic pole 35 which contacts with the plasmon generator 34. Hence, it is desirable that the heat sink 44 at least have a higher heat conductivity than that of the clad layer 33, and have the higher heat conductivity than that of the magnetic pole 35 in particular. Incidentally, the heat conductivity of the clad layer 33 is up to about 30 W/(m·K) when a constituent material thereof is $Al_2O_3$, and remains up to about 1.3 W/(m·K) when it is $SiO_2$. Also, the heat conductivity of the magnetic pole 35 is about 90 W/(m·K) when a constituent material thereof is an alloy of Co, Ni, and Fe.

More specifically, the heat sink 44 can be configured using one or more selected from a group consisting of Ag (silver), Cu, (copper), Au (gold), Al (aluminum), W (tungsten), Si (silicon), Ir (iridium), Mo (molybdenum), Zn (zinc), Ru (ruthenium), Co (cobalt), Ni (nickel), Cr (chromium), Fe (iron), Pt (platinum), Rh (rhodium), Sn (tin), Ta (tantalum), Nb (niobium), diamond, AlN (aluminum nitride), SiC (silicon carbide), SiAlN, and BN (boron nitride). Those other than Co, Ni, and Fe among these materials are preferable, in that they are less likely to cause a magnetic influence such as erroneous erasure of the magnetic information in an adjacent track that is not an object of writing, for example. Also, among the materials described above, Cu, W, Si, Mo, Zn, Ru, Cr, Pt, Rh, Ta, Nb, AlN, SiC, and SiAlN are preferable, in that a polishing process thereof is relatively easy to perform in forming the ABS 11S in a manufacturing process. In particular, W, Si, Mo, Ru, Cr, Pt, Rh, Ta, Nb, AlN, SiC, and SiAlN are preferable, in that they are superior in corrosion resistance and structure stability, and have a high long-term reliability. Further, AlN, SiC, and SiAlON among them are preferable, in that, since they have an electrical insulating property, measures (such as patterning) for avoiding contacting with other metallic parts (such as wirings) in manufacturing process steps become unnecessary.

In the write head portion 16 having such a configuration, the write current flowing in the coil 41 causes the magnetic flux in a magnetic path which is mainly structured by the leading shield 29, the bottom yoke layer 28, the coupling layer 30, the coupling portions 40A and 40B, the coupling layers 36 and 37, the top yoke layer 43, and the magnetic pole 35. Thereby, the signal magnetic field is generated in the vicinity of the end face, exposed on the ABS 11S, of the magnetic pole 35, and the signal magnetic field reaches a predetermined regional part on the recording surface (described later) of the magnetic disk 2.

Further, in the magnetic read write head 10, the protecting film 17, formed of $Al_2O_3$ etc., is formed to cover the entire upper face of the write head portion 16.

The light source unit 50, provided in the rear of the magnetic read write head 10, is provided with a laser diode 60 as a light source which emits the laser light, and a rectangular parallelepiped-shaped supporting member 51 which supports the laser diode 60.

The supporting member 51 is formed by a ceramic material such as $Al_2O_3$.TiC, for example. As illustrated in FIG. 4, the supporting member 51 has an adhesion surface 51A which is to be adhered to the back face 11B of the substrate 11, and a light source mounting surface 51C which is orthogonal to the adhesion surface 51A. The light source mounting surface 51C is parallel to the element forming face 11A. The laser diode 60 is mounted on the light source mounting surface 51C. It is desirable that the supporting member 51, besides the function of supporting the laser diode 60, have a function as a heat sink for dissipating heat generated by the laser diode 60.

A laser diode that is commonly used for such applications as communications, optical disc storage and material analysis, such as InP type, GaAs type, and GaN type, is applicable for the laser diode 60. A wavelength of the laser light which the laser diode 60 emits may be at any value within a range of, for example, 375 nm to 1.7 μm. Specifically, it may be an InGaAsP/InP quarternary mixed crystal laser diode having an emittable wavelength range of 1.2 to 1.67 μm, for example. As illustrated in FIG. 4, the laser diode 60 has a multilayer structure including a lower electrode 61, an active layer 62, and an upper electrode 63. An n-type semiconductor layer 65 including an n-type AlGaN, for example, is inserted between the lower electrode 61 and the active layer 62, and a p-type semiconductor layer 66 including a p-type AlGaN, for example, is inserted between the active layer 62 and the upper electrode 63. A reflecting layer 64 formed of, for example, SiO$_2$ or Al$_2$O$_3$, for exciting oscillation by total reflection of light is provided on two cleavage planes of the multilayer structure. The reflecting layer 64 has an opening for allowing the laser light to be outputted in a position of the active layer 62 including an emission center 62A. Relative positions between the light source unit 50 and the magnetic read write head 10 are so fixed that the emission center 62A and a rear end face 32A of the waveguide 32 coincide with each other by attaching the adhesion surface 51A of the supporting member 51 to the back face 11B of the substrate 11. The laser diode 60 has a thickness $T_{LA}$ of around 60 to 200 μm, for example. When a predetermined voltage is applied between the lower electrode 61 and the upper electrode 63, the laser light is outputted from the emission center 62A of the active layer 62, and is incident on the rear end face 32A of the waveguide 32. Incidentally, the laser light to be outputted from the laser diode 60 is preferably TM-mode polarized light whose electric field oscillates in a direction perpendicular to a plane of the active layer 62. The laser diode 60 can be driven by using a power supply inside the magnetic disk device. The magnetic disk device is usually provided with a power supply that generates a voltage of about 2 V, for example. This voltage of the power supply is sufficient to drive the laser diode 60. Also, the laser diode 60 has a power consumption of, for example, about several tens of milliwatts, which can be sufficiently covered by the power supply in the magnetic disk device.

Figure 6:
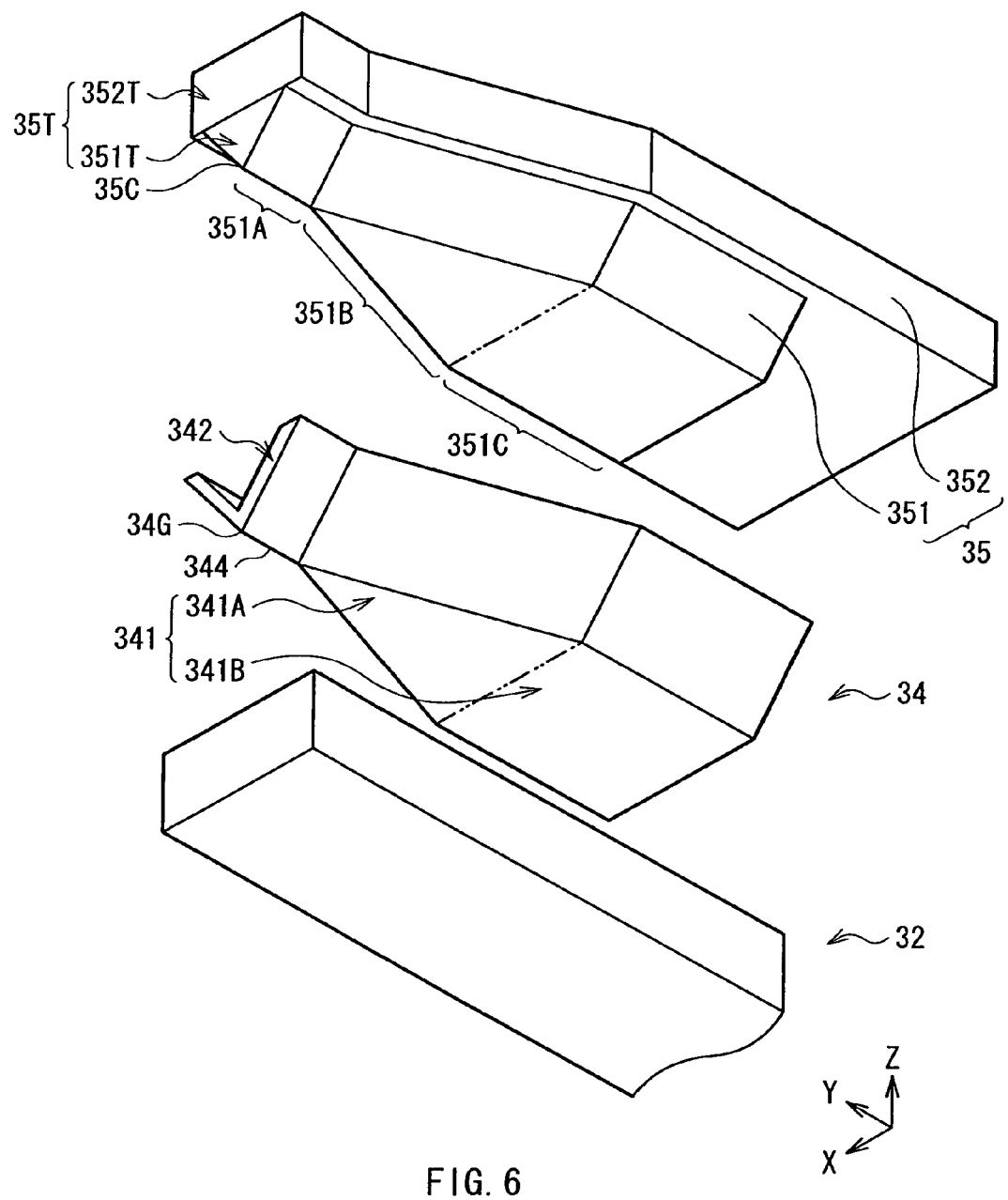
FIG. 6 is an exploded perspective view illustrating a configuration of the major part of the magnetic read write head.
Figure 7:
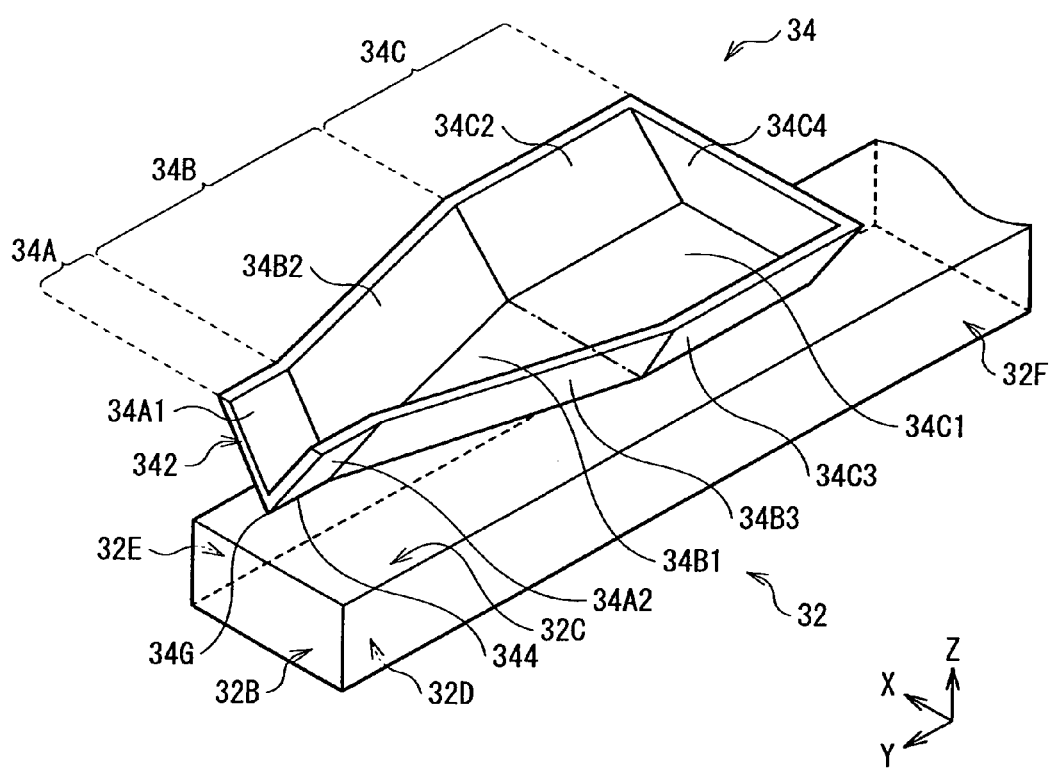
FIG. 7 is another perspective view illustrating the configuration of the major part of the magnetic read write head.
Figure 8:
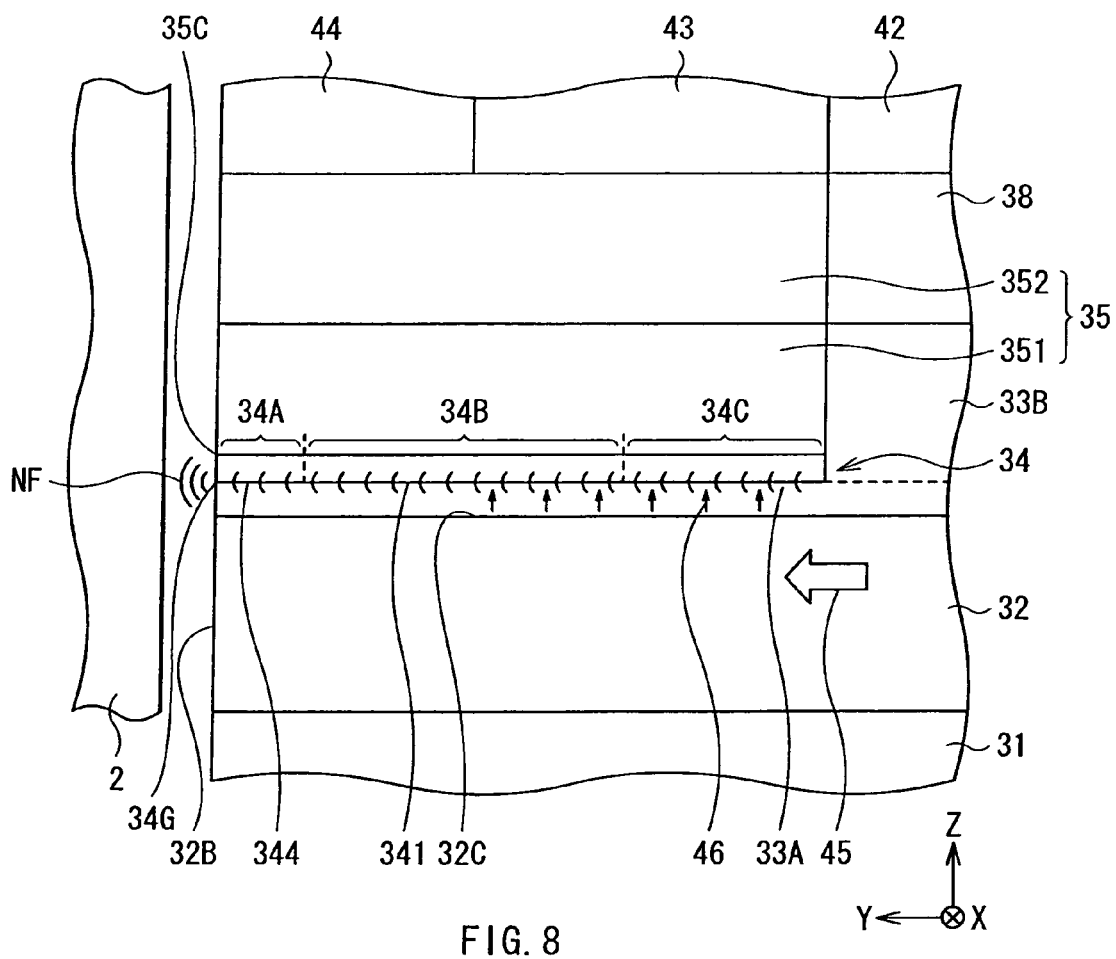
FIG. 8 is a cross-sectional view illustrating a configuration of a cross-section orthogonal to the air bearing surface in the major part of the magnetic read write head.
Figure 9:
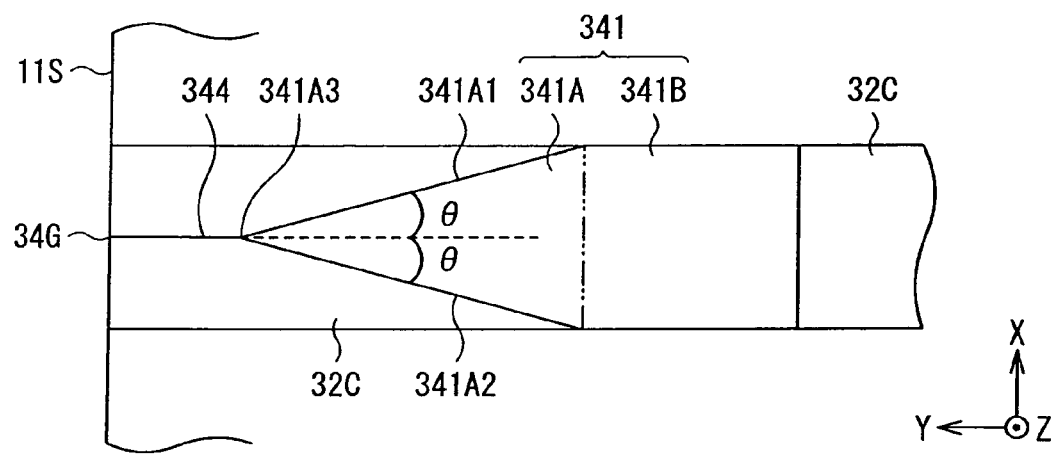
FIG. 9 is a plan view illustrating the major part of the magnetic read write head.

Next, the configurations and the functions etc. of the waveguide 32, the plasmon generator 34, and the magnetic pole 35 will be described in detail. FIG. 6 is an exploded perspective view illustrating configurations of the waveguide 32, the plasmon generator 34, and the magnetic pole 35, and FIG. 7 is a perspective illustrating shapes of the waveguide 32 and the plasmon generator 34 as well as a positional relationship thereof. FIG. 8 is a cross-sectional view, orthogonal to the ABS 11S, illustrating the configurations and the effects of the waveguide 32, the plasmon generator 34, and the magnetic pole 35. FIG. 9 is a plan view illustrating a major part of the plasmon generator 34 as viewed from above.

Aside from the incident end 32A illustrated in FIG. 4, the waveguide 32 has an end face 32B that is closer to the ABS 11S, an evanescent light generating surface 32C which is a top face, a bottom face 32D, and two side faces 32E and 32F, as illustrated in FIG. 7, for example. The evanescent light generating surface 32C generates evanescent light based on the laser light propagated through the waveguide 32. FIG. 6 to FIG. 9 illustrate an example where the end face 32B is located at the ABS 11S. However, the end face 32B may be located at a position away from the ABS 11S.

As illustrated in FIGS. 6 and 7, the plasmon generator 34 includes a first portion 34A, a second portion 34B, and a third portion 34C, which are arranged in order from a side of the ABS 11S. In FIG. 7, a boundary between the first portion 34A and the third portion 34C is illustrated by a chain double-dashed line.

The first potion 34A has a configuration in which a pair of plate-like sidewalls 34A1 and 34A2 are so connected to each other, at a tip edge 344, as to have a V-shape in a cross-section parallel to the ABS 11S. The sidewalls 34A1 and 34A2 have a front end face 342 exposed on the ABS 11S. The tip edge 344 is a boundary part between the pair of sidewalls 34A1 and 34A2, and extends in the Y-axis direction from a tip portion 34G, exposed on the ABS 11S, as an origin, until the second portion 34B. The tip portion 34G is a portion which generates the near-field light. The tip edge 344 is opposed to the evanescent light generating surface 32C of the waveguide 32. The sidewalls 34A1 and 34A2 are so slanted that a mutual spacing in the X-axis direction increases, from the tip edge 344 as an origin, with increasing distance from the waveguide 32. However, a shape of the cross-section parallel with the ABS 11S in the first portion 34A is constant regardless of a distance from the ABS 11S.

The second potion 34B has a plate-like bottom portion 34B1 opposed to the evanescent light generating surface 32C, and two plate-like sidewalls 34B2, and 34B3. The bottom portion 34B1 is so configured that a width in the track-width direction (X-axis direction) is zero in a boundary part with the first portion 34A and increases with increasing distance from the ABS 11S. The sidewalls 34B2 and 34B3 stand, in both end edges of the bottom portion 34B1 in the X-axis direction, toward an opposite side of the waveguide 32. Herein, the sidewalls 34B2 and 34B3 are so slanted that a mutual spacing (a distance in the X-axis direction) increases, from a connection portion with the bottom portion 34B1 as an origin, with increasing distance from the waveguide 32. Also, the sidewalls 34B2 and 34B3 are coupled to the sidewalls 34A1 and 34A2 in the first section 34A, respectively.

The third portion 34C has a bottom portion 34C1 continuous to the bottom portion 34B1 of the second portion 34B, a sidewall 34C2 continuous to the sidewall 34B2 of the second portion 34B, a sidewall 34C3 continuous to the sidewall 34B3 of the second portion 34B, and a wall portion 34C4 coupled to rear end portions of the bottom portion 34C1 and sidewalls 34C2 and 34C3. Herein, the sidewalls 34C2 and 34C3 are so slanted that a mutual spacing (a distance in the X-axis direction) increases, from a connection portion with the bottom portion 34C1 as an origin, with increasing distance from the waveguide 32. Also, upper end edges of the respective sidewalls 34C2 and 34C3 extend parallel to each other. Incidentally, the wall portion 34C4 may not be provided.

As illustrated in FIGS. 6 and 7, the first portion 34A, the second portion 34B, and the third portion 34C form a space for accommodating therein the first layer 351 of the magnetic pole 35.

As illustrated in FIG. 6, faces of the bottom portions 34B1 and 34C1, which are opposed at a predetermined spacing to the evanescent light generating surface 32C of the waveguide 32, are a first face 341A and a second face 341B structuring a surface plasmon exciting surface 341, respectively. In FIG. 6, a boundary between the first face 341A and the second face 341B is illustrated by a chain double-dashed line.

As illustrated in FIGS. 5 and 6, the magnetic pole 35 has an end face 35T exposed on the ABS 11S. This end face 35T includes an end face 351T in the first layer 351 exposed on the ABS 11S, and an end face 352T in the second layer 352 exposed on the ABS 11S.

The first layer 351 of the magnetic pole 35 is accommodated in the space formed by the first portion 34A, the second portion 34B, and the third portion 34C of the plasmon generator 34. In detail, the first layer 351 has a first portion 351A occupying a space formed by the first portion 34A, a second portion 351B occupying a space formed by the second portion 34B, and a third portion 351C occupying a space formed by the third portion 34C. The first portion 351A has a triangular prism shape which closely contacts with the sidewalls 34A1 and 34A2 in the first portion 34A of the plasmon generator 34, and the area of a cross-section parallel to the ABS 11S is constant. The end face 351T in the first portion 351A has an apex 35C located at a top on an opposite side of the second layer 352. The second portion 351B closely contacts with the sidewalls 34B2 and 34B3 and the bottom portion 34B1 in the second portion 34B of the plasmon generator 34. A width in the X-axis direction of the second portion 351B increases with increasing distance from the ABS 11S, and increases in the Z-axis direction with increasing distance from the waveguide 32. The third portion 351C closely contacts with the sidewalls 34C2 and 34C3 and the bottom portion 34C1 of the third portion 34C of the plasmon generator 34. A width in the X-axis direction of the third portion 351C is constant in the Y-axis direction, and increases in the Z-axis direction with increasing distance from the waveguide 32.

The second layer 352 of the magnetic pole 35 has a bottom face which contacts with a top face of the first layer 351 and a face on an upper end of each of the first to the third portions 34A to 34C of the plasmon generator 34.

As illustrated in FIG. 8, a portion in the clad layer 33 provided between the evanescent light generating surface 32C and the surface plasmon exciting surface 341 is a buffer portion 33A. A portion in the clad layer 33 located in the rear of the plasmon generator 34 and the first layer 351 is a rear portion 33B.

FIG. 9 is a plan view illustrating a positional relationship between the surface plasmon exciting surface 341 and the evanescent light generating surface 32C, and illustrates a state where the plasmon generator 34 and the waveguide 32 are viewed from a side of the magnetic pole 35. Meanwhile, as to the plasmon generator 34, only the face opposed to the evanescent light generating surface 32C is illustrated, and illustration of the others is omitted. As illustrated in FIG. 9, a width in the X-axis direction of the first face 341A decreases as it approaches the ABS 11S. The first face 341A has a front end portion 341A3 at a position where both end edges 341A1 and 341A2 in the X-axis direction intersect each other. Angles of the respective end edges 341A1 and 341A2 relative to a direction perpendicular to the ABS 11S (the Y-axis direction) are equal. Hereinafter, these angles are indicated by "θ". The angle θ is within a range of from 3 degrees to 50 degrees, for example, and is preferably within a range of from 10 degrees to 25 degrees in particular.

[Manufacturing Method of Magnetic Read Write Head]

Next, a manufacturing method of the magnetic read write head 10 will be described with reference to FIGS. 10 to 18 in addition to FIG. 4. FIGS. 10 to 18 are for describing a process of forming a major part of the magnetic read write head 10, and illustrate cross-sectional configurations of a position which eventually becomes the ABS 11S. In the following, description will be first given on outline of an overall manufacturing process with reference to FIG. 4, and then description will be given in detail on the process of forming the major part (plasmon generator 34, the magnetic pole 35, and the heat sink 44) with reference to FIGS. 10 to 18. Herein, since details such as forming materials and shapes of a series of elements have been already described in detail, descriptions thereon are omitted as needed.

This magnetic read write head 10 is manufactured mainly by sequentially forming and stacking the series of elements using existing thin-film processes. The existing thin-film processes are, for example, a film-forming technique such as a electrolytic plating method and a sputtering method, a patterning technique such as a photolithography method, an etching technique such as a dry etching method and a wet etching method, and a polishing technique such as a chemical-mechanical polishing (CMP: chemical mechanical polishing) method.

Here, the substrate 11 the insulating layer 13 is first formed. Then, the bottom shield layer 21, the MR element 22 and the insulating layer 24, and the top shield layer 23 are formed and stacked in this order on the insulating layer 13, to form the read head portion 14. Then, the insulating layer 25, the intermediate shield layer 26, and the insulating layer 27 are stacked in order on the read head portion 14.

Thereafter, the bottom yoke layer 28, the leading shield 29 and the coupling layer 30, the clad layer 31, the waveguide 32, the clad layer 33, the plasmon generator 34, the magnetic pole 35, and the coupling layers 36 and 37 are formed in order on the insulating layer 27. Further, the insulating layer 38 is so formed as to cover the entire part, and a planarizing process is then performed to planarize the upper faces of the magnetic pole 35, the insulating layer 38, and the coupling layer 37, and the coil 41 embedded by the insulating layers 39 and 42 is then formed. Further, the top yoke layer 43 connected to the magnetic pole 35 and the coupling layer 37 is formed, and the heat sink 44 is then so formed as to contact with a part of the magnetic pole 35, to complete the write head portion 16. Thereafter, the protecting film 17 is formed on the write head portion 16, and lastly, a CMP method is used to collectively polish a side face of a multilayer structure from the substrate 11 to the protecting film 17 to form the ABS 11S. Thereby, the magnetic read write head 10 is completed.

Figure 10:
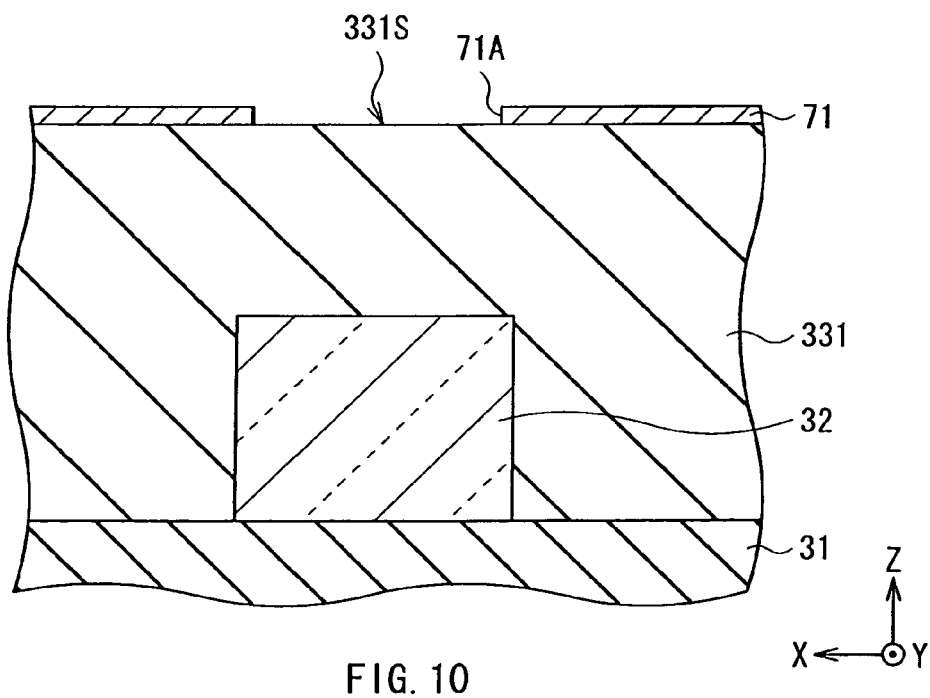
FIG. 10 is a cross-sectional view for describing a manufacturing process of the major part of the magnetic read write head.

In forming the major part of the magnetic read write head 10, first, a dielectric layer 331 is so formed as to cover the waveguide 32 provided on the clad layer 31, as illustrated in FIG. 10. The dielectric layer 331 eventually becomes a part of the clad layer 33, and is configured of a predetermined dielectric material described above. Thereafter, an etching mask 71 formed of a metal, for example, is formed on the dielectric layer 331. This etching mask 71 has an opening 71A, which has a slightly larger dimension than an outer edge of an upper end of the to-be-formed plasmon generator 34.

Figure 11:
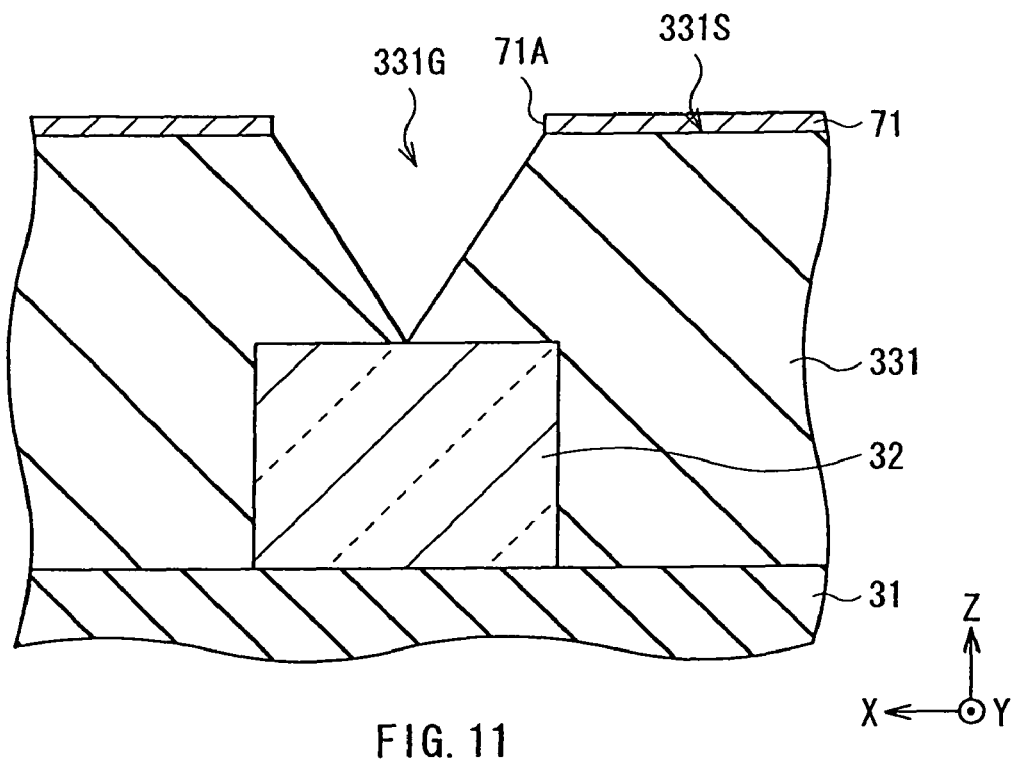
FIG. 11 is a cross-sectional view for describing a step subsequent to that of FIG. 10.

Then, as illustrated in FIG. 11, a reactive-ion etching is used, for example, to dug down a portion (an exposed portion) corresponding to the opening 71A in the dielectric layer 331 to form a groove 331G in the dielectric layer 331. The groove 331G is so formed that a bottom edge thereof reaches an upper face of the waveguide 32. Herein, a shape of the groove 331G is configured to be slightly larger than an outer shape of the to-be-formed plasmon generator 34.

Figure 12:
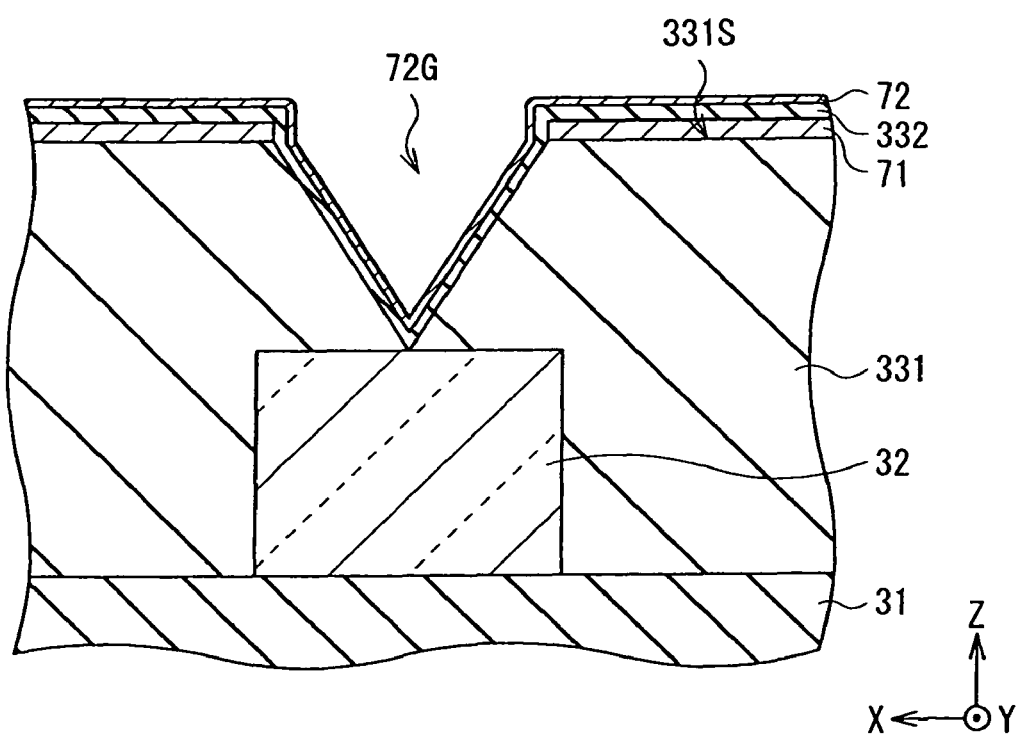
FIG. 12 is a cross-sectional view for describing a step subsequent to that of FIG. 7.

Then, as illustrated in FIG. 12, a dielectric layer 332 is so formed as to cover an upper face of the entire structure illustrated in FIG. 11 with a sputtering method, for example. As with the dielectric layer 331, the dielectric layer 332 eventually becomes a part of the clad layer 33, and is configured of a predetermined dielectric material described above. After forming the dielectric layer 332, a contact film 72 is so formed as to cover the dielectric film 332 with a sputtering method, for example. The contact film 72 is formed of Ti (titanium) or Ta (tantalum), for example, and has a function of increasing an adhesion property between the clad layer 33 and the plasmon generator 34. A thickness of the contact film 72 is about 1 nm. The dielectric layer 332 and the contact film 72 are formed also in a region corresponding to the groove 331G and to the opening 71A. The structure after the formation of the contact film 72 is in a state in which a concave portion 72G for accommodating the to-be-formed plasmon generator 34 is formed.

Figure 13:
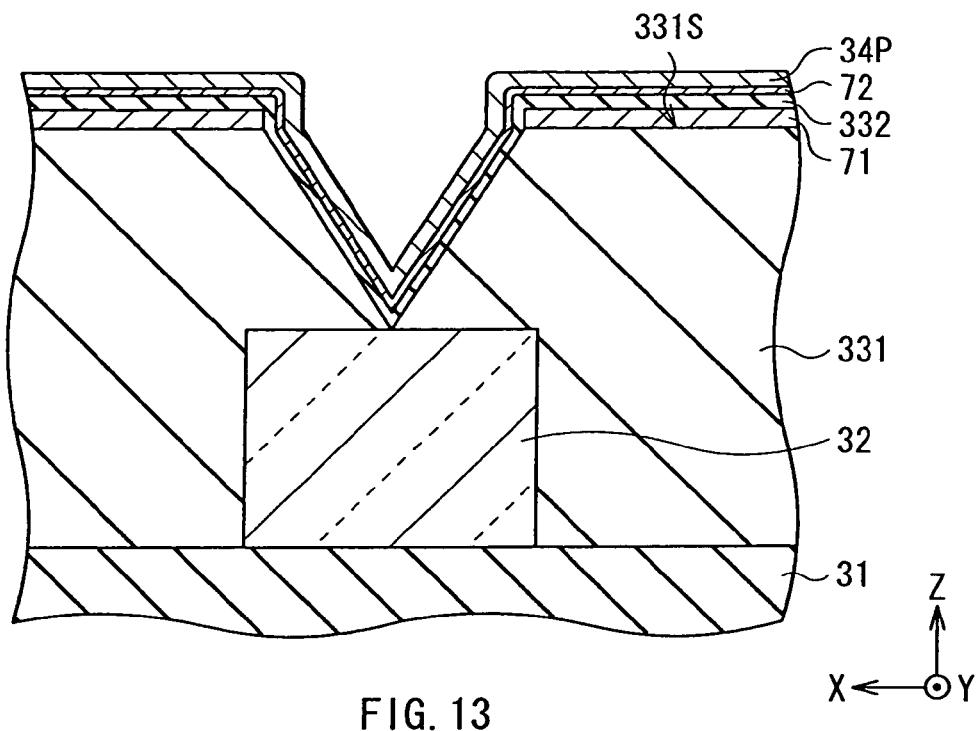
FIG. 13 is a cross-sectional view for describing a step subsequent to that of FIG. 8.
Figure 14:
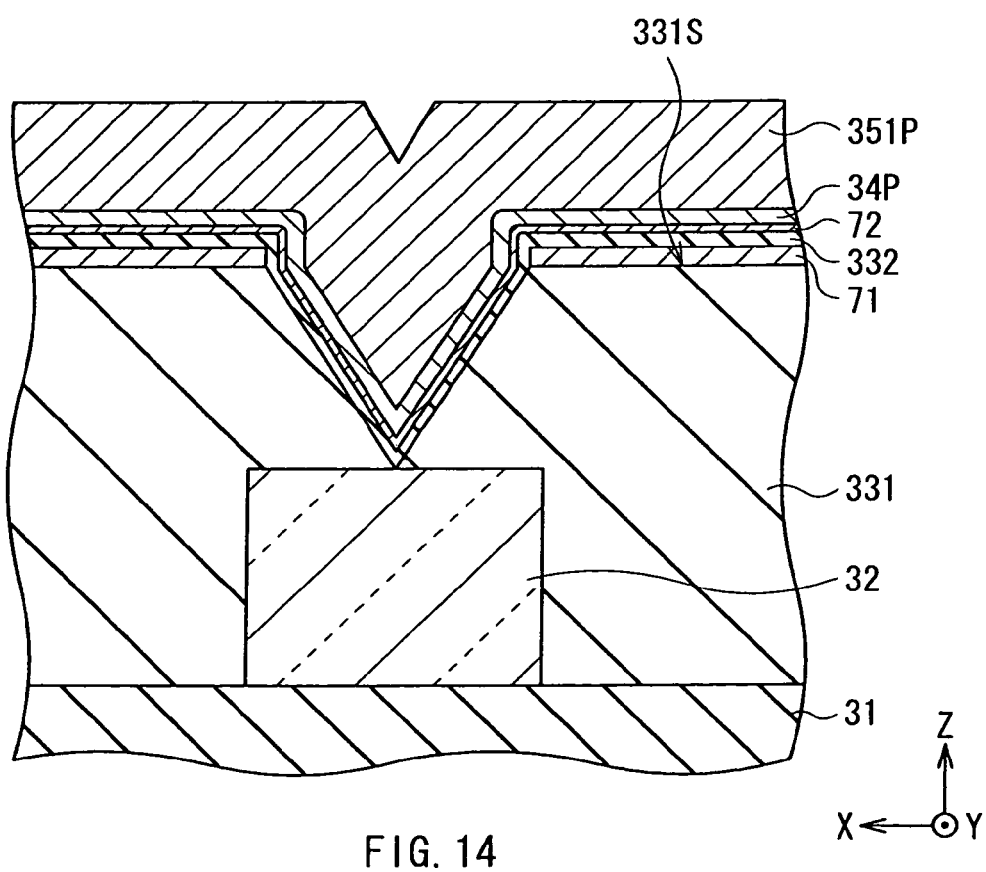
FIG. 14 is a cross-sectional view for describing a step subsequent to that of FIG. 9.

Then, as illustrated in FIG. 13, a metal film 34P, which eventually becomes the plasmon generator 34, is so formed as to cover thoroughly the contact film 72 with a sputtering method, for example. Further, as illustrated in FIG. 14, a magnetic layer 351P, which eventually becomes the first layer 351 of the magnetic pole 35, is formed on the metal film 34P with a plating method, for example. The magnetic layer 351P is so formed as to at least completely fill the groove 331G.

Figure 15:
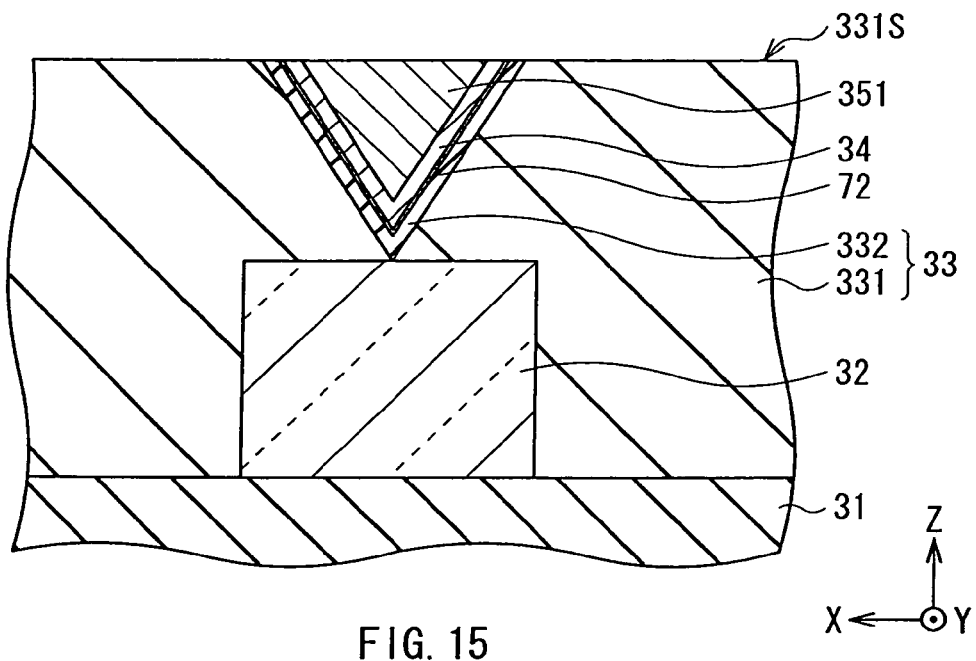
FIG. 15 is a cross-sectional view for describing a step subsequent to that of FIG. 10.

Then, as illustrated in FIG. 15, polishing is performed with a chemical-mechanical polishing (CMP) method, for example, until the etching mask 71 is exposed, to remove portions of the magnetic layer 351P, the metal film 34P, the contact film 72, and the dielectric layer 332 that cover the etching mask 71. Thereafter, etching is performed thoroughly with ion-beam etching, for example, until an upper face 331S of the dielectric layer 331 is exposed. Thereby, the magnetic layer 351P, the metal film 34P, the contact film 72, and the dielectric layer 332 remain only inside the groove 331G. The remaining dielectric layer 332 becomes the buffer portion 33A, and structures the clad layer 33 together with the dielectric layer 331. Also, the metal film 34P becomes the plasmon generator 34, and the magnetic layer 351P becomes the first layer 351 of the magnetic pole 35.

Figure 16:
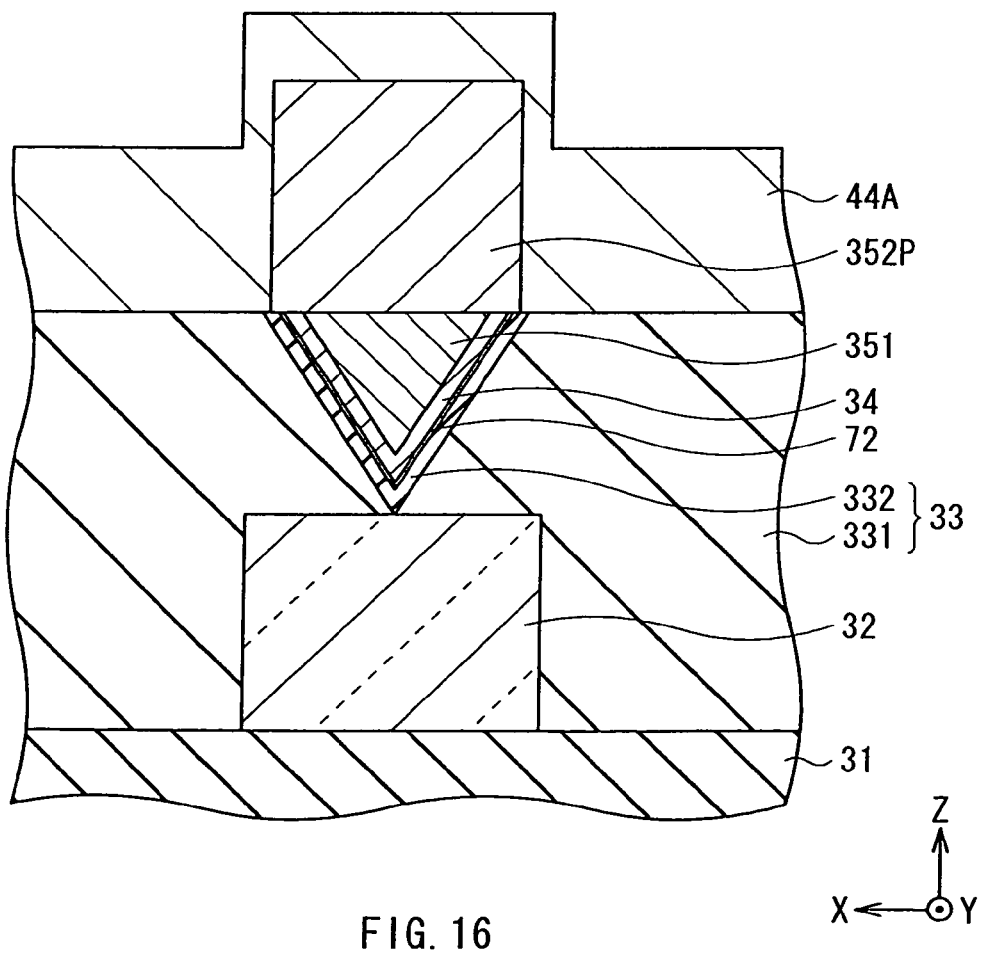
FIG. 16 is a cross-sectional view for describing a step subsequent to that of FIG. 11.
Figure 17:
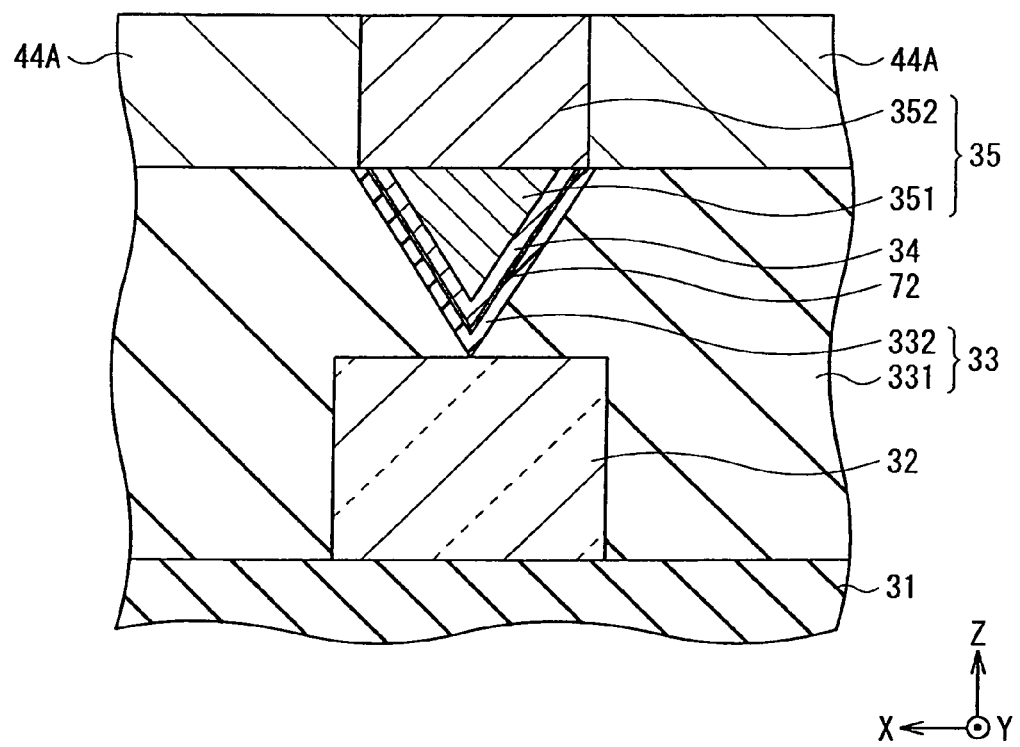
FIG. 17 is a cross-sectional view for describing a step subsequent to that of FIG. 12.
Figure 18:
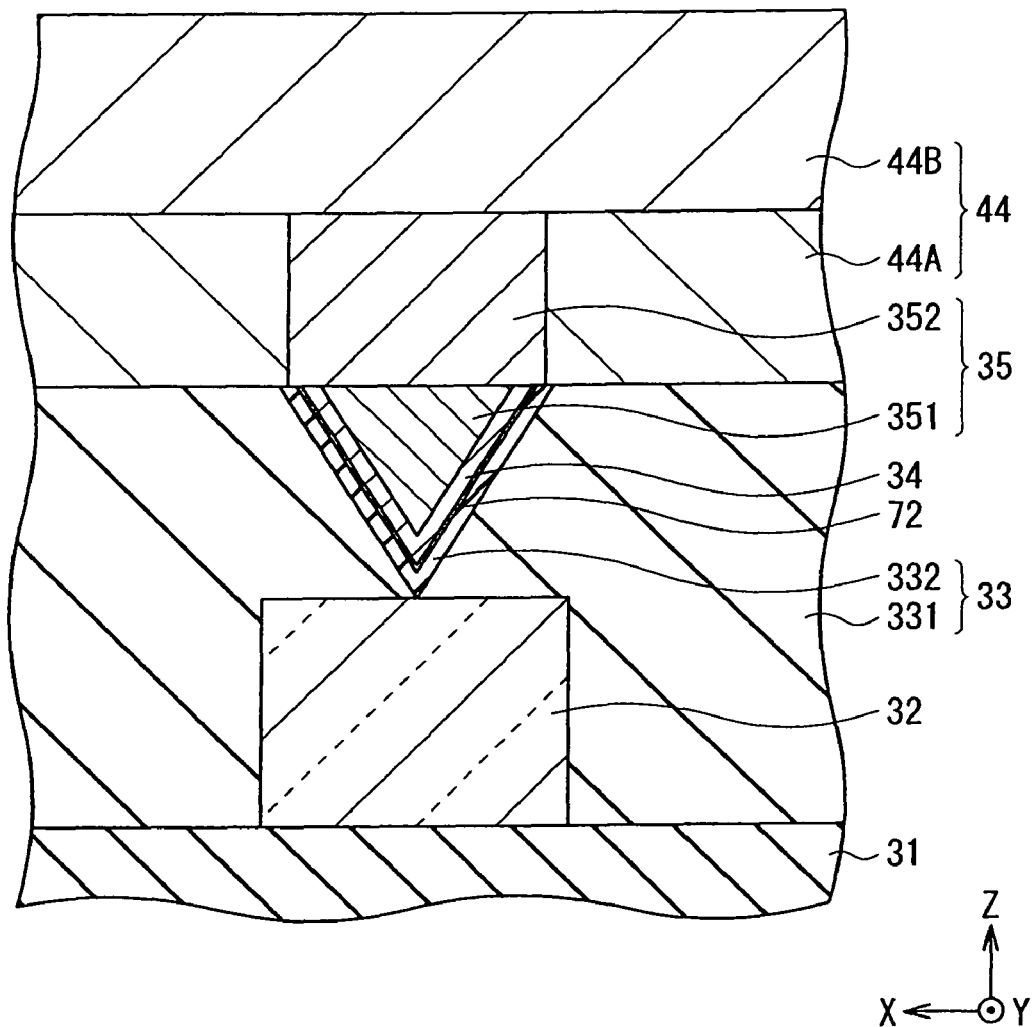
FIG. 18 is a cross-sectional view for describing a step subsequent to that of FIG. 13.

Thereafter, as illustrated in FIG. 16, a magnetic layer 352P, which eventually becomes the second layer 352 of the magnetic pole 35, is formed on the first layer 351 with a plating method, for example. Further, a highly heat-conductive material layer 44A, which eventually becomes a part of the heat sink 44, is so formed as to cover the entire part, and polishing is then performed throughout an entire surface with a CMP method, for example. Thereby, as illustrated in FIG. 17, the second layer 352, whose side faces are in contact with the highly heat-conductive material layer 44A, is formed, and the magnetic pole 35 is completed. Finally, a highly heat-conductive material layer 44B is so formed as to cover the highly heat-conductive material layer 44A and the second layer 352 as illustrated in FIG. 18, by which the heat sink 44 formed of the highly heat-conductive material layers 44A and 44B is completed.

[Control Circuit of Magnetic Disk Device]

Figure 19:
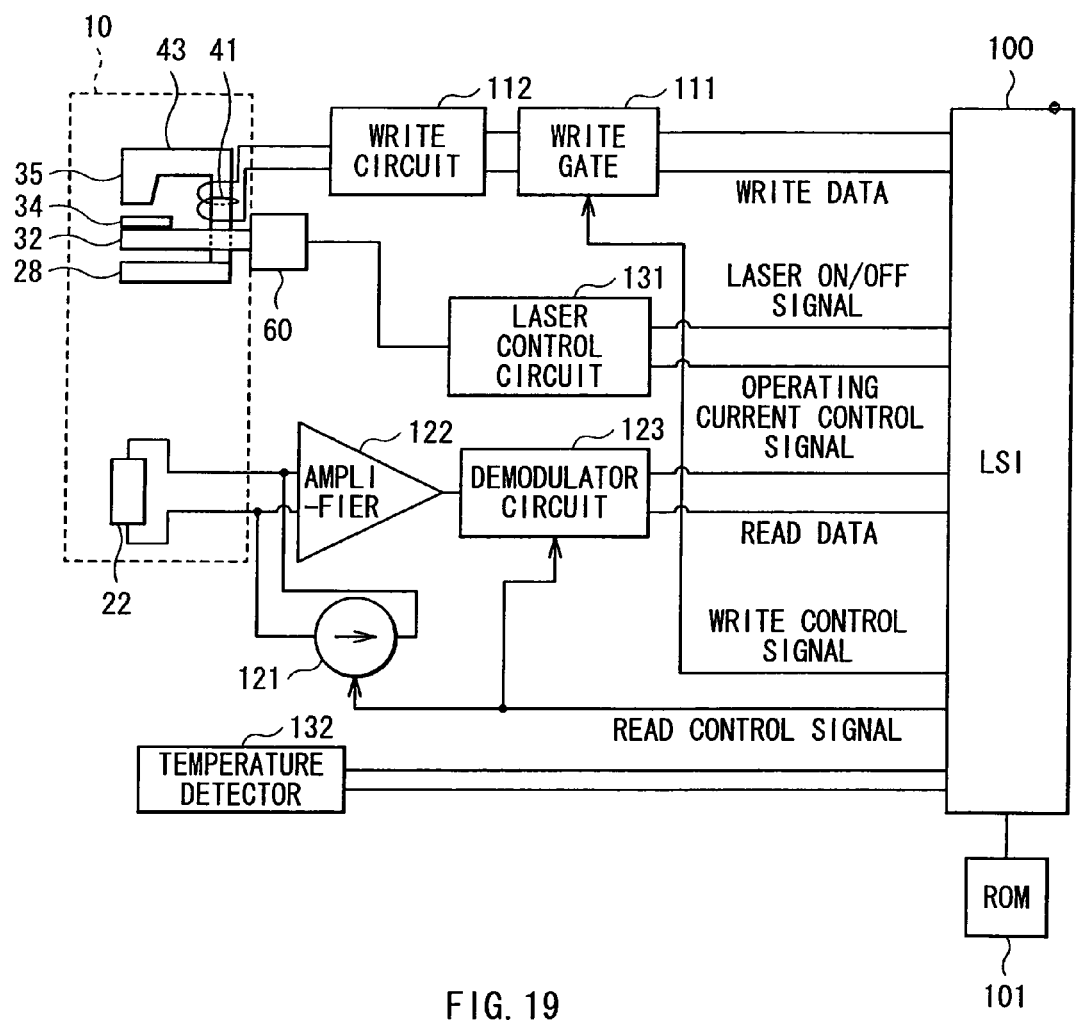
FIG. 19 is a block diagram illustrating a circuit configuration of the magnetic disk device illustrated in FIG. 1.

Reference is now made to FIG. 19 to describe a circuit configuration of a control circuit of the magnetic disk device illustrated in FIG. 1 and an operation of the magnetic read write head 10. This control circuit is provided with a control LSI (a large-scale integrated circuit) 100, a ROM (a read-only memory) 101 connected to the control LSI 100, a write gate 111 connected to the control LSI 100, and a write circuit 112 which connects the write gate 111 and the coil 41. This control circuit further includes a constant current circuit 121 connected to the MR element 22 and the control LSI 100, an amplifier 122 connected to the MR element 22, and a demodulator circuit 123 connected to an output end of the amplifier 122 and the control LSI 100. This control circuit further includes a laser control circuit 131 connected to the laser diode 60 and the control LSI 100, and a temperature detector 132 connected to the control LSI 100.

Herein, the control LSI 100 supplies write data and applies a write control signal to the write gate 111. Also, the control LSI 100 applies a read control signal to the constant current circuit 121 and the demodulator circuit 123, and receives read data outputted from the demodulator circuit 123. In addition, the control LSI 100 applies a laser ON/OFF signal and an operating current control signal to the laser control circuit 131.

The temperature detector 132 detects a temperature in a magnetic recording layer of the magnetic disk 2, and transmits information on the temperature to the control LSI 100.

The ROM 101 contains therein a control table and the like, in order to control a value of an operating current to be supplied to the laser diode 60.

In a write operation, the control LSI 100 supplies the write data to the write gate 111. The write gate 111 supplies the write data to the write circuit 112 only when the write control signal indicates the write operation. The write circuit 112 allows the write current to flow in the coil 41 in accordance with the write data. Thereby, the write magnetic field is generated by the magnetic pole 35, and data is written in the magnetic recording layer of the magnetic disk 2 through the write magnetic field.

In a read operation, the constant current circuit 121 supplies a constant sense current to the MR element 22 only when the read control signal indicates the read operation. An output voltage of the MR element 22 is amplified by the amplifier 122, and is inputted to the demodulator circuit 123. When the read control signal indicates the read operation, the demodulator circuit 123 demodulates the output of the amplifier 122 to generate the read data, and applies the same to the control LSI 100.

The laser control circuit 131 controls a supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the operating current at or above an oscillation threshold is supplied to the laser diode 60 by a control of the laser control circuit 131. Thereby, the laser diode 60 emits the laser light, and the laser light is propagated through the waveguide 32. Then, the near-field light NF (described later) is generated from the tip portion 34G of the plasmon generator 34, and a part of the magnetic recording layer of the magnetic disk 2 is heated by the near-field light NF, thereby lowering the coercivity of that part. When writing, the write magnetic field generated by the magnetic pole 35 is applied to a part of the magnetic recording layer with the lowered coercivity to perform the writing of data.

On the basis of the temperature of the magnetic recording layer of the magnetic disk 2 measured by the temperature detector 132 and the like, the control LSI 100 refers to the control table stored in the ROM 101 to determine the value of the operating current of the laser diode 60, and, by using the operating current control signal, controls the laser control circuit 131 so that the operating current of that value is supplied to the laser diode 60. The control table contains, for example, data that indicates the oscillation threshold and a temperature dependence of a light output versus operating current characteristic of the laser diode 60. The control table may further contain data that indicates a relationship between the operating current value and a temperature increase of the magnetic recording layer heated by the near-field light NF, and data that indicates the temperature dependence of the coercivity of the magnetic recording layer.

The control circuit illustrated in FIG. 19 has, independent of a control signal system for the read/write operations, a signal system for controlling the laser diode 60, i.e., the signal system for the laser ON/OFF signal and the operating current control signal. This makes it possible to implement more various modes of energization of the laser diode 60, not only to energize the laser diode 60 simply in association with the write operation. Incidentally, the configuration of the control circuit of the magnetic disk device is not limited to that illustrated in FIG. 19.

Figure 20:
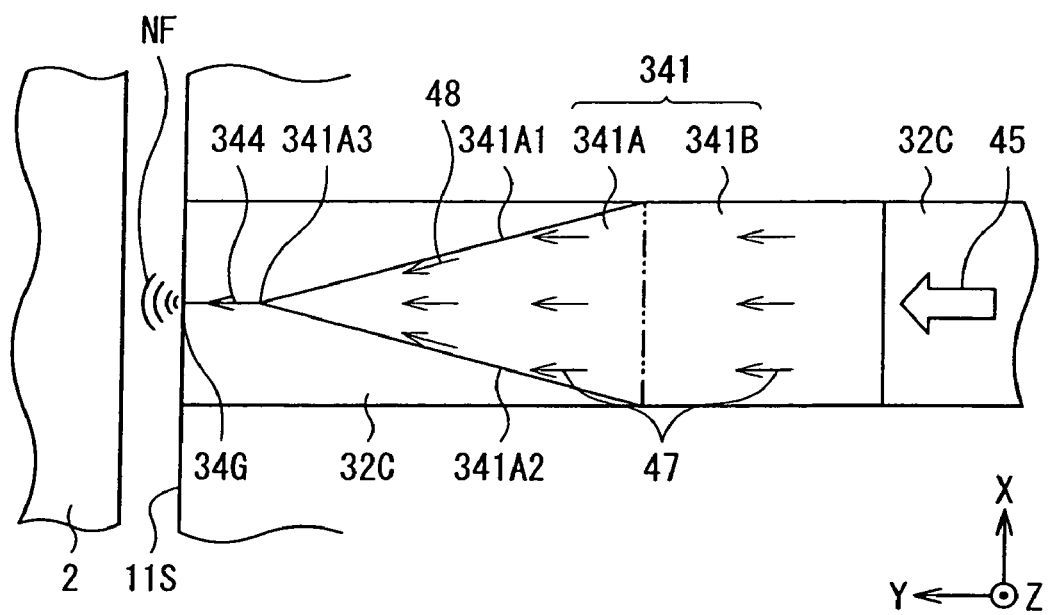
FIG. 20 is an explanatory view for describing an operation of the magnetic read write head.

Reference is now made to FIG. 8 and FIG. 20 to describe a principle of generation of the near-field light and a principle of a heat assist magnetic recording using the near-field light in this embodiment. FIG. 20 is a plan view illustrating, as in FIG. 9, a positional relationship between the surface plasmon exciting surface 341 and the evanescent light generating surface 32C, and illustrates a state in which the plasmon generator 34 and the waveguide 32 are viewed from a side of the magnetic pole 35.

Laser light 45 emitted from the laser diode 60 is propagated through the waveguide 32 to reach the vicinity of the plasmon generator 34. Herein, the laser light 45 is totally reflected at the evanescent light generating surface 32C which is an interface between the waveguide 32 and the buffer portion 33A, thereby generating evanescent light 46 (FIG. 8) which permeates into the buffer section 33A. Thereafter, this evanescent light 46 and fluctuations of charges on the surface plasmon exciting surface 341 in an outer surface of the plasmon generator 34 are coupled with each other to consequently induce surface plasmons 47 (FIG. 20). The surface plasmons 47 propagate over the surface plasmon exciting surface 341 toward the tip portion 34G. As has been already described, the first face 341A in the surface plasmon exciting surface 341 is so configured that the width in the X-axis direction is narrowed as it approaches the ABS 11S. Hence, when the surface plasmons 47 propagate over the first face 341A, they are gradually transformed into edge plasmons 48 (FIG. 20) which are surface plasmons that propagate along the end edges 341A1 and 341A2, and an electric field intensity of the plasmons including the surface plasmons 47 and the edge plasmons 48 is enhanced. The surface plasmons 47 and the edge plasmons 48 are transformed into edge plasmons 49 (FIG. 20) when they reach the tip edge 344, and propagate along the tip edge 344 toward the ABS 11S. The edge plasmons 49 eventually reach the tip portion 34G. As a result, the edge plasmons 49 concentrate at the tip portion 34G, and the near-field light NF is generated from the tip portion 34G based on the edge plasmons 49. The near-field light NF is irradiated toward the magnetic disk 2, reaches the surface of the magnetic disk 2, and heats a part of the magnetic recording layer of the magnetic disk 2. Thereby, the coercivity in a part of the magnetic recording layer which is heated is lowered. In the heat assist magnetic recording, the write magnetic field generated by the magnetic pole 35 is applied to a part of the magnetic recording layer with the lowered coercivity to perform the writing of data.

Herein, in the plasmon generator 34, the near-field light NF is generated by the excitement by the irradiation of the laser light 45, while a part of energy belonging to the laser light 45 is converted into heat energy which is absorbed. As a result, a rise in temperature of the plasmon generator 34 occurs. Thereby, the magnetic pole 35 which contacts with the plasmon generator 34 is subjected to the heat energy from the plasmon generator 34. However, since the magnetic pole 35 is in contact with the heat sink 44 having the higher heat conductivity, most of the heat energy from the plasmon generator 34 passes through the magnetic pole 35 promptly to move to the heat sink 44, and is consequently released to the outside.

The enhancement of the electric field intensity of the plasmons in the first face 341A may be considered due to the following first and second principles. First, a description will be given on the first principle. In this embodiment, first, in the surface plasmon exciting surface 341, the surface plasmons 47 are excited on a metal surface by the evanescent light 46 generated by the evanescent light generating surface 32C. These surface plasmons 47 propagate over the surface plasmon exciting surface 341 toward the tip portion 34G. The wave number of the surface plasmons 47 propagating through the first face 341A gradually increases as the width in the X-axis direction of the first face 341A is reduced, i.e., as it approaches the ABS 11S. As the wave number of the surface plasmons 47 increases, a speed of travel of the surface plasmons 47 decreases. It may be considered that this consequently increases an energy density of the surface plasmons 47, and enhances the electric field intensity of the surface plasmons 47.

Next, a description will be given on the second principle. When the surface plasmons 47 propagate over the surface plasmon exciting surface 341 toward the tip portion 34G, a part of the surface plasmons 47 impinge on the end edges 341A1 and 341A2 of the first face 341A to scatter, thereby generating a plurality of plasmons with different wave numbers. A part of the plurality of plasmons thus generated is transformed into the edge plasmons 48 which have the wave number higher than those of the surface plasmons propagating over a flat surface. In this way, the surface plasmons 47 are gradually transformed into the edge plasmons 48 that propagate along the end edges 341A1 and 341A2, whereby the electric field intensity of the edge plasmon 48 gradually increases. Also, as compared with the surface plasmons propagating over the flat surface, the edge plasmons 48 are higher in wave number and lower in speed of travel. Hence, the transformation of the surface plasmons 47 into the edge plasmons 48 increases the energy density of the plasmons. Further, in the first face 341A, the transformation of the surface plasmons 47 into the edge plasmons 48 occurs as described above, and the new surface plasmons 47 based on the evanescent light 46 generated from the evanescent light generating surface 32c are also generated. These new surface plasmons 47 are also transformed into the edge plasmons 48. For these reasons, the electric field intensity of the edge plasmons 48 is increased. The edge plasmons 48 are transformed into the edge plasmons 49 that propagate the tip edge 344. Thus, the edge plasmons 49 of the enhanced electric field intensity as compared with the surface plasmons 47 originally generated are obtained.

In this embodiment, the surface plasmons 47 which propagate over the flat surface and the edge plasmons 48 having the wave number higher than that of the surface plasmons 47 coexist in the first face 341A. It may be considered that, in the first face 341A, the increase in the electric field intensity occurs in both the surface plasmons 47 and the edge plasmons 48 based on the first and the second principles described above. According to this embodiment, it is therefore possible to further increase the electric field intensity of the plasmons as compared with a case where only either one of the first principle and the second principle is in operation.

[Effect of Magnetic Disk Device]

Thus, according to this embodiment, the magnetic pole 35 is in contact with the heat sink 44 having the higher heat conductivity than that of the clad layer 33 which surrounds the waveguide 32. This suppresses the heating of the magnetic pole 35 accompanied by the rise in temperature of the plasmon generator 34 in performing the heat assist magnetic recording. Hence, corrosion of the magnetic pole 35 which generates the write magnetic field does not occur even when the magnetic pole 35 and the plasmon generator 34 are arranged closely to each other. As a result, it is possible to achieve more efficient yet stable writing operation while ensuring long-term reliability. In particular, in this embodiment, the material having the higher heat conductivity than that of the material structuring the magnetic pole 35 is used as the constituent material of the heat sink 44. This makes it possible to effectively release the heat of the magnetic pole 35, and to further improve the long-term reliability.

For example, when energy of 10 mW was applied to the end face 35T of the magnetic pole 35, a temperature of the end face 35T was 170 degrees centigrade when the surrounding of the second layer 352 was covered by $SiO_2$ (1.3 W/(m·K)) without forming the heat sink 44. In contrast, when the heat sinks 44 were formed by the respective materials of $Al_2O_3$ (30 W/(m·K)), SiC (60 W/(m·K)), CoNiFe ((90 W/(m·K)), and AlN ((140 W/(m·K)) and others were in the same condition, the temperatures of the end faces 35T were 149 degrees centigrade, 128 degrees centigrade, 109 degrees centigrade, and 97 degrees centigrade, respectively, and the effects thereof clearly appeared.

Although the invention has been described hereinbefore with reference to the embodiment, the invention is not limited to the above-described embodiment, and various modifications are possible. For example, in this embodiment, the description has been given with reference to the CPP-type GMR element for the read element, although it is not limited thereto. It may be a CIP (Current In Plane)-GMR element. In this case, it is necessary to provide insulating layers between the MR element and the bottom shield layer and between the MR element and the top shield layer, respectively, and to insert a pair of leads for supplying the sense current to the MR element in the insulating layers. Alternatively, a TMR (tunneling magnetoresistance) element having a tunneling junction film can be used for the read element.

Correspondence relationships between the reference numerals and the elements in this embodiment are represented collectively as follows.

1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . drive section, 7 . . . fixed shaft, 8 . . . bearing, 9 . . . spindle motor, 10 . . . magnetic read write head, 11 . . . substrate, 11A . . . element forming face, 11S . . . air bearing surface (ABS), 13 . . . insulating layer, 14 . . . read head portion, 16 . . . write head portion, 17 . . . protecting layer, 21 . . . bottom shield layer, 22 . . . MR element, 23 . . . top shield layer, 24, 25, 27, 38, 39, 42 . . . insulating layers, 28 . . . bottom yoke layer, 29 . . . leading shield, 30, 36, 37 . . . coupling layers, 31, 33 . . . clad layers, 32 . . . waveguide, 34 . . . plasmon generator, 34A to 34C . . . first to third portions, 34G . . . tip portion, 341 . . . surface plasmon exciting surface, 344 . . . tip edge, 35 . . . magnetic pole, 351 . . . first layer, 352 . . . second layer, 40A, 40B . . . coupling portions, 41 . . . coil, 43 . . . top yoke layer, 44 . . . heat sink, 45 . . . laser light, 46 . . . evanescent light, 47 . . . surface plasmons, 48, 49 . . . edge plasmons, 50 . . . light source unit, 51 . . . supporting member, 60 . . . laser diode, 61 . . . lower electrode, 62 . . . active layer, 63 . . . upper electrode, 64 . . . reflecting layer, 65 . . . n-type semiconductor layer, 66 . . . p-type semiconductor layer, NF . . . near-field light.

What is claimed is:

1. A heat assist magnetic write head, comprising:
   a magnetic pole having an end face exposed on an air bearing surface;
   a waveguide extending toward the air bearing surface to propagate light; and
   a plasmon generator provided between the magnetic pole and the waveguide, and generating near-field light based on the light propagated through the waveguide to emit the generated near-field light from the air bearing surface,
   wherein the waveguide is surrounded by a clad layer, and the magnetic pole is in contact with a heat sink having a heat conductivity higher than that of the clad layer.

2. The heat assist magnetic write head according to claim 1, wherein the heat conductivity of the heat sink is higher than a heat conductivity of the magnetic pole.

3. The heat assist magnetic write head according to claim 1, wherein the heat sink is substantially formed of one or more selected from a group consisting of Ag (silver), Cu (copper), Au (gold), Al (aluminum), W (tungsten), Si (silicon), Ir (iridium), Mo (molybdenum), Zn (zinc), Ru (ruthenium), Co (cobalt), Ni (nickel), Cr (chromium), Fe (iron), Pt (platinum), Rh (rhodium), Sn (tin), Ta (tantalum), Nb (niobium), diamond, AlN (aluminum nitride), SiC (silicon carbide), SiAlN, and BN (boron nitride).

4. The heat assist magnetic write head according to claim 1, wherein the magnetic pole and the plasmon generator are in contact with each other, and the heat sink contacts with faces in the magnetic pole other than faces in the magnetic pole which contact with the plasmon generator.

5. The heat assist magnetic write head according to claim 1, wherein the waveguide is formed of a dielectric material which transmits laser light, and the clad layer is formed of a dielectric material whose refractive index is smaller than that of the dielectric material structuring the waveguide.

6. The heat assist magnetic write head according to claim 5, wherein the waveguide is formed of $Al_2O_3$ (aluminum oxide) or $Ta_2O_5$ (tantalum oxide), and the clad layer is formed of $SiO_2$ (silicon dioxide) or $Al_2O_3$ (aluminum oxide).

7. The heat assist magnetic write head according to claim 1, wherein the plasmon generator has a V-shaped end face, which is exposed on the air bearing surface and which includes a tip edge protruding toward the waveguide.

8. The heat assist magnetic write head according to claim 1, wherein the heat sink has an end face exposed on the air bearing surface, and extends in a direction away from the air bearing surface while contacting with the magnetic pole.

9. A head gimbals assembly, comprising:
   a magnetic head slider having a side face which is provided with the heat assist magnetic write head according to claim 1; and
   a suspension having an end portion on which the magnetic head slider is mounted.

10. A head arm assembly, comprising:
    a magnetic head slider having a side face which is provided with the heat assist magnetic write head according to claim 1;
    a suspension having an end portion on which the magnetic head slider is mounted; and
    an arm supporting the suspension at the other end portion thereof.

11. A magnetic disk device, comprising a magnetic recording medium and a head arm assembly,
    wherein the head arm assembly includes:
    a magnetic head slider having a side face which is provided with the heat assist magnetic write head according to claim 1;
    a suspension having an end portion on which the magnetic head slider is mounted; and
    an arm supporting the suspension at the other end portion thereof.

* * * * *